United States Patent
Singh et al.

(10) Patent No.: US 12,525,029 B2
(45) Date of Patent: Jan. 13, 2026

(54) DETECTING OCCLUDED OBJECTS WITHIN IMAGES FOR AUTONOMOUS SYSTEMS AND APPLICATIONS

(71) Applicant: NVIDIA Corporation, Santa Clara, CA (US)

(72) Inventors: Anurag Singh, Santa Clara, CA (US); Sakib Ar Rahman, Ajax (CA); Tao Fu, Jiangsu (CN); Yifang Xu, San Jose, CA (US); Gang Pan, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/525,061

(22) Filed: Nov. 30, 2023

(65) Prior Publication Data
US 2025/0182494 A1 Jun. 5, 2025

Related U.S. Application Data

(63) Continuation of application No. 18/524,757, filed on Nov. 30, 2023.

(51) Int. Cl.
*G06V 20/58* (2022.01)
*G01S 17/89* (2020.01)
*G06V 10/26* (2022.01)
*G06V 10/74* (2022.01)
*G06V 10/764* (2022.01)

(52) U.S. Cl.
CPC ............ *G06V 20/58* (2022.01); *G01S 17/89* (2013.01); *G06V 10/26* (2022.01); *G06V 10/761* (2022.01); *G06V 10/764* (2022.01)

(58) Field of Classification Search
CPC ...... G06V 20/58; G06V 10/761; G06V 10/26; G06V 10/764; G01S 17/89
See application file for complete search history.

(56) References Cited

U.S. PATENT DOCUMENTS

| 8,004,565 B2 | 8/2011 | Herz |
| 9,747,527 B2 | 8/2017 | Baranowski et al. |

(Continued)

OTHER PUBLICATIONS

Singh, Anurag; Non-Final Office Action for U.S. Appl. No. 18/524,757, filed Nov. 30, 2023, mailed Nov. 19, 2025, 32 pgs.

*Primary Examiner* — Girumsew Wendmagegn
(74) *Attorney, Agent, or Firm* — Iron Summit IP LLP

(57) ABSTRACT

In various examples, detecting occluded objects within images or other sensor data representations for autonomous or semi-autonomous systems and applications is described herein. Systems and methods described herein may determine when objects are occluded at portions of images using various techniques. For example, an image may be processed in order to determine classifications associated with objects depicted by the image and, the classifications, along with labels that are projected on the image using a map, may then be used to determine whether one or more of the objects are occluded in the image. For another example, a map may be used to determine first distances to points within an environment and a point cloud may be used to determine second distances to the points within the environment. The distances may then be used to determine whether one or more objects are occluded within the image.

20 Claims, 20 Drawing Sheets

(56) References Cited

U.S. PATENT DOCUMENTS

| | | |
|---|---|---|
| 10,257,449 B2 | 4/2019 | Avadhanam et al. |
| 11,195,331 B2 | 12/2021 | Lee et al. |
| 11,210,537 B2 | 12/2021 | Koivisto et al. |
| 2021/0012120 A1 | 1/2021 | Gummadi et al. |
| 2021/0150230 A1 | 5/2021 | Smolyanskiy et al. |
| 2022/0261593 A1 | 8/2022 | Yu et al. |
| 2023/0154313 A1 | 5/2023 | Wilmes et al. |
| 2025/0116528 A1* | 4/2025 | Mori .................. G01C 21/3896 |
| 2025/0182435 A1 | 6/2025 | Singh et al. |
| 2025/0182494 A1 | 6/2025 | Singh et al. |

* cited by examiner

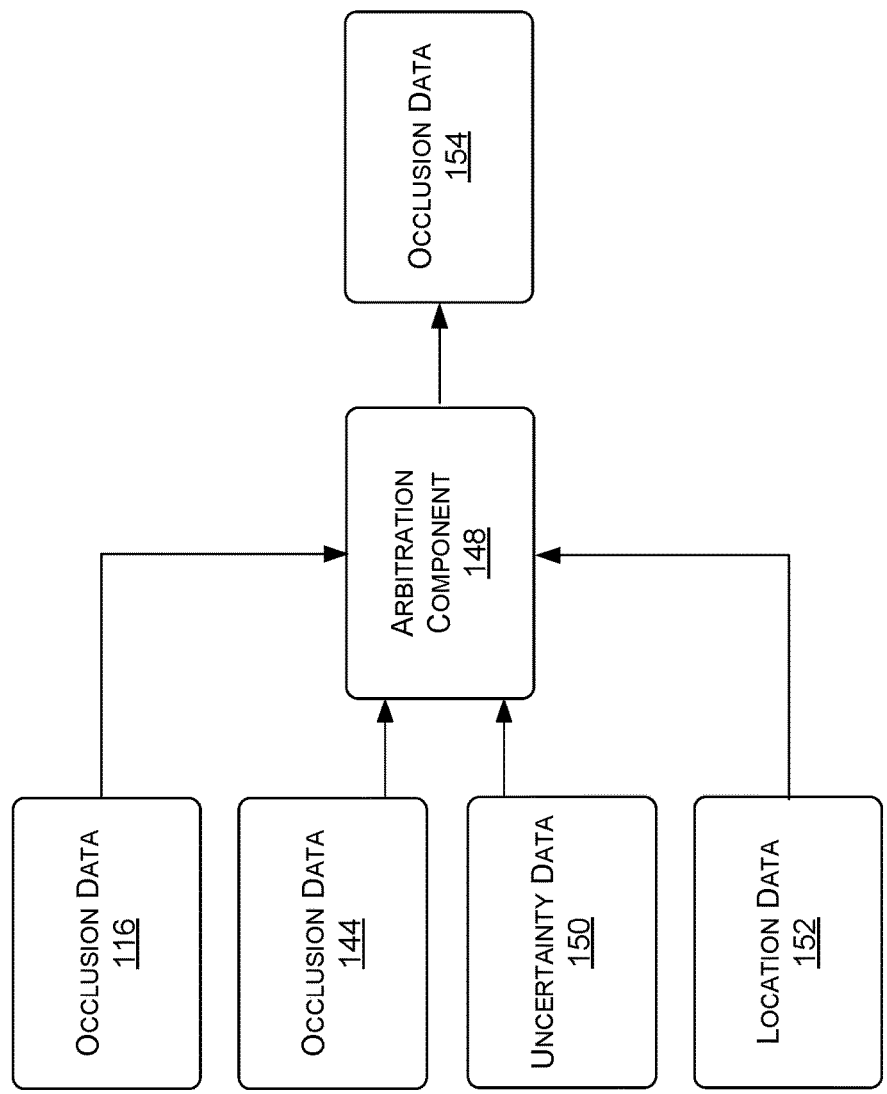

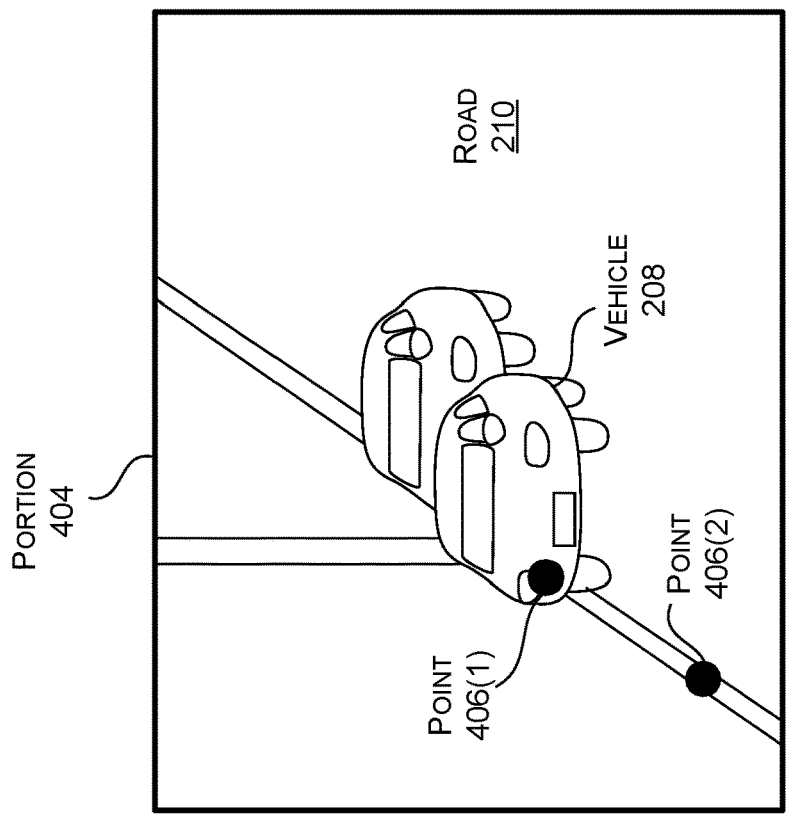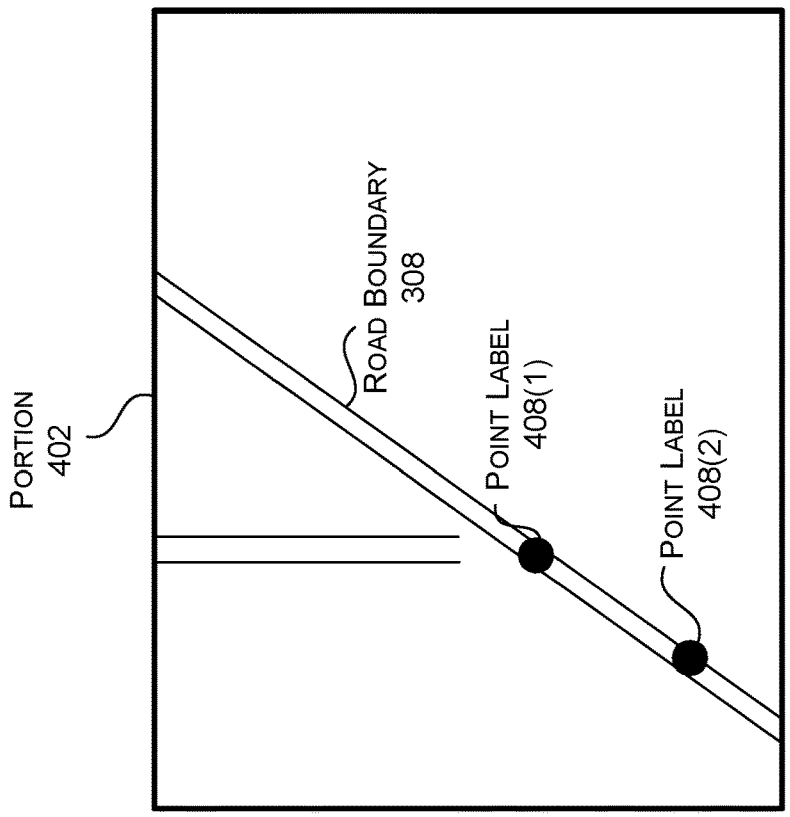
FIGURE 4A

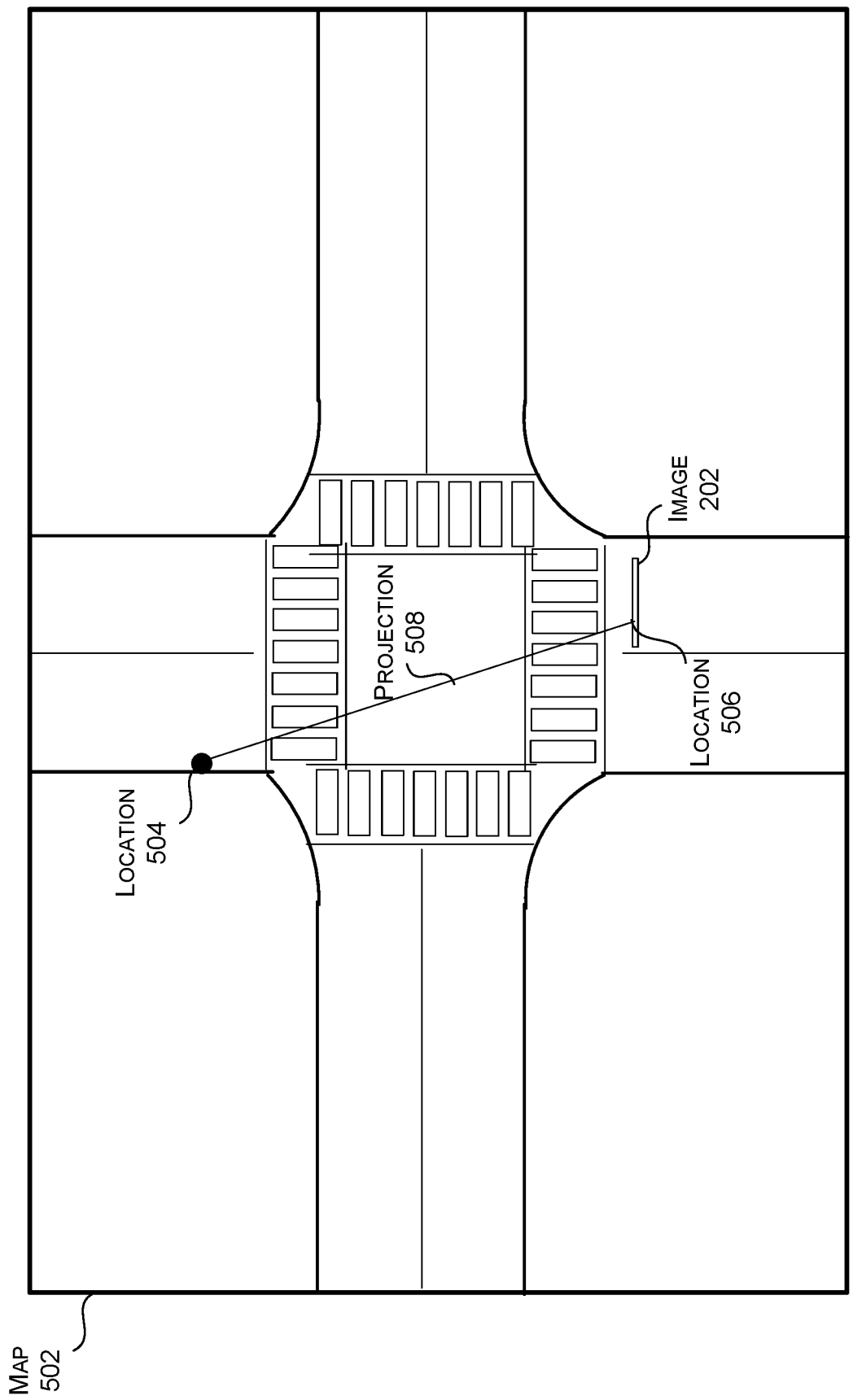

1000

```
┌─────────────────────────────────────────────────────────┐
│ DETERMINE, BASED AT LEAST ON MAP DATA ASSOCIATED WITH   │
│ AN ENVIRONMENT, A FIRST DISTANCE ASSOCIATED WITH A POINT│
│ WITHIN THE ENVIRONMENT THAT CORRESPONDS TO A PORTION    │
│                      OF AN IMAGE                        │
│                         B1002                           │
└─────────────────────────────────────────────────────────┘
                             │
                             ▼
┌─────────────────────────────────────────────────────────┐
│ DETERMINE, BASED AT LEAST ON POINT CLOUD DATA, A SECOND │
│   DISTANCE ASSOCIATED WITH THE POINT WITHIN THE         │
│                     ENVIRONMENT                         │
│                        B1004                            │
└─────────────────────────────────────────────────────────┘
                             │
                             ▼
┌─────────────────────────────────────────────────────────┐
│ DETERMINE, BASED AT LEAST ON THE FIRST DISTANCE AND THE │
│ SECOND DISTANCE, WHETHER A TRAFFIC OBJECT IS OCCLUDED   │
│                AT THE PORTION OF THE IMAGE              │
│                         B1006                           │
└─────────────────────────────────────────────────────────┘
                             │
                             ▼
┌─────────────────────────────────────────────────────────┐
│ GENERATE DATA INDICATING WHETHER THE TRAFFIC OBJECT IS  │
│        OCCLUDED AT THE PORTION OF THE IMAGE             │
│                         B1008                           │
└─────────────────────────────────────────────────────────┘
```

FIGURE 10

DETECTING OCCLUDED OBJECTS WITHIN IMAGES FOR AUTONOMOUS SYSTEMS AND APPLICATIONS

CROSS-REFERENCE TO RELATED APPLICATIONS

This application is a Continuation of U.S. patent application Ser. No. 18/524,757, filed Nov. 30, 2023, which is hereby incorporated by reference in its entirety.

BACKGROUND

Labeling images—or other sensor data representations—generated using machines navigating within environments may be important for many purposes. For example, the images may be labeled in order to generate ground truth data that is then used to train machine learning models to perform various tasks. As such, conventional systems may label images using maps, such as by using labels for various objects (e.g., traffic signs, traffic poles, driving surfaces, etc.) represented by the maps to generate labels for corresponding objects depicted by the images. However, in some circumstances, objects may be occluded within the images, such as when dynamic objects and/or static objects are located within the environments and between the machines generating the images and the labeled objects. As such, if a map indicates that a traffic object (e.g., a road boundary, a road line, etc.) should be located at a specific portion (e.g., pixel, etc.) of an image, but the image depicts a vehicle at the portion of the image, then the conventional systems may wrongfully generate a ground truth label for the image. This mislabeled ground truth may then be used to train a model to make inaccurate predictions, or may require a human labeler to quality check the label, update the label, and thus increase the manual effort and overall time required to generate high-quality ground truth data.

SUMMARY

Embodiments of the present disclosure relate to detecting occluded objects within images or other sensor data representations (e.g., LiDAR point clouds, RADAR data, range or projection images, etc.) for autonomous or semi-autonomous systems and applications. For instance, systems and methods described herein may determine when objects or features, such as traffic objects or features, dynamic or static objects, etc. are occluded at portions (e.g., pixels, points, etc.) of images or other sensor data representations using one or more techniques. For a first example, and for an image, the image may be processed in order to determine classifications associated with objects depicted by the image. The classifications, along with labels that are projected on the image using a map, may then be used to determine whether one or more of the objects are occluded. For a second example, and again for an image, a map may be used to determine first distances to points within an environment and a point cloud may be used to determine second distances to the points within the environment. The distances may then be used to determine whether one or more objects are occluded within the image. In some examples, systems and methods may combine the techniques to determine final results indicating whether objects are occluded within images.

In contrast to conventional systems, the current systems, in some embodiments, are able to determine when objects that should be depicted within images or other sensor data representations are in fact occluded by one or more other objects. For instance, the conventional systems may merely use the labels associated with the objects from the map to generate labels for corresponding objects depicted within the images. However, if the objects are occluded within the images, such as by one or more other dynamic and/or static objects, then the labels for the images may be incorrect. As such, by performing one or more of the techniques described herein, the current systems are able to both generate labels for objects depicted within the images as well as generate additional labels indicating whether portions of the objects are occluded at various portions of the images. Because of this, the current systems may provide numerous improvements, such as generating ground truth data that is more accurate and precise, generate ground truth data with no or less human involvement, generating training data that may be relied upon to train machine learning models to perform various tasks (e.g., detect objects, determine paths, identify road features (e.g., lane lines, road boundary lines, crosswalks, signs, wait conditions, etc.), and/or so forth.

BRIEF DESCRIPTION OF THE DRAWINGS

The present systems and methods for detecting occluded objects within images or other sensor data representations for autonomous or semi-autonomous systems and applications are described in detail below with reference to the attached drawing figures, wherein:

FIGS. 1A-1C illustrate example data flow diagrams for processes of detecting occluded objects within images, in accordance with some embodiments of the present disclosure;

FIG. 4A illustrates an example of determining whether a traffic object is occluded at a portion of an image, in accordance with some embodiments of the present disclosure;

FIG. 5 illustrates an example of projecting a three-dimensional point within an environment to a two-dimensional portion of an image and then using the projection to determine information associated with the portion of the image, in accordance with some embodiments of the present disclosure;

FIG. 10 is a flow diagram showing a method for detecting occluded objects within images using one or more point cloud techniques, in accordance with some embodiments of the present disclosure;

DETAILED DESCRIPTION

Figure 1A:
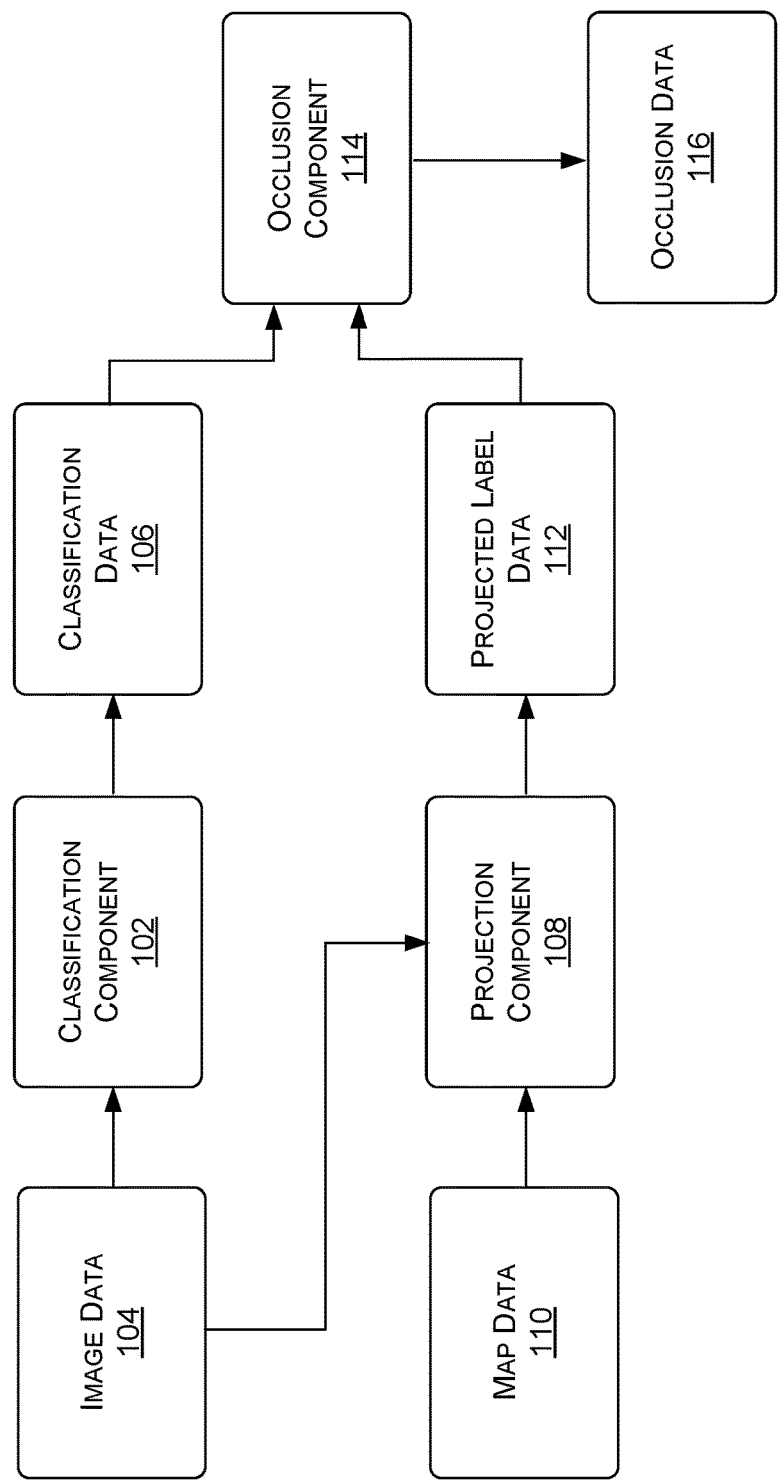

Systems and methods are disclosed related to detecting occluded objects within images or other sensor data representations for autonomous or semi-autonomous systems and applications. Although the present disclosure may be described with respect to an example autonomous or semi-autonomous vehicle or machine 1200 (alternatively referred to herein as "vehicle 1200," "ego-vehicle 1200," "ego-machine 1200, or "machine 1200," this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to occlusion detection for ground truth data generation in autonomous or semi-autonomous systems and applications, this is not intended to be limiting, and the systems and methods described herein may be used in augmented reality, virtual reality, mixed reality, robotics, security and surveillance, autonomous or semi-autonomous machine applications, and/or any other technology spaces where object detection and/or map creation may be used.

For instance, a system(s) may receive image data and/or other sensor data generated using one or more sensors of one or more machines navigating within an environment. In examples where image data is used, the image data may represent or correspond to one or more images depicting the environment. In examples using other sensor modalities—such as LiDAR, RADAR, ultrasonic, etc.—the sensor data may represent other sensor data representations, such as range images, projections images, point clouds, etc. For conciseness, the examples presented herein are primarily discussed with respect to images, but the techniques described herein can be applied to other sensor modalities and sensor data representations as well. The system(s) may then be configured to process the image(s) in order to generate labels for objects depicted within the image(s). For instance, in some examples, and for an image, the system(s) may be configured to generate labels for traffic objects depicted within the image such as, but not limited to, roads, road boundaries, road lines, traffic lights, traffic signs, traffic polls, parking spots, wait conditions, static objects or features, features or objects in warehouse, office, retail, commercial, aerial, amphibious, and/or other environments, and/or any other type of traffic, road, environmental, and/or perceivable object or feature. In some examples, the system(s) may use a map associated with the environment to label the traffic objects depicted by the image. Additionally, in some examples, the system(s) may be configured to generate labels for other types of objects, such as structures, pedestrians, vehicles, vegetation, and/or any other type of object. As described herein, in some examples, at least a portion of at least one traffic object or feature (and/or other type of object or feature) may be occluded, such as by another object. As such, the system(s) may be configured to perform one or more techniques to indicate portions of the image that are associated with occluded portions of traffic objects or features.

For instance, in some examples, the system(s) may use an image processing technique to determine portions of images that are associated with occluded traffic objects located within the environment. For instance, and for an image, the system(s) may process image data representing the image using one or more models, such as one or more machine learning models, one or more neural networks, one or more segmentation models, one or more classification models, one or more perception models, and/or any other type of model trained to perform object segmentation and/or classification. For example, based at least on the processing, the model(s) may generate various classifications and/or segmentation masks associated with the objects depicted by the image. As described herein, a classification may include, but is not limited to, road, sidewalk, building, wall, fence, poll, traffic light, traffic sign, vegetation, terrain, sky, person, rider, car, truck, bus, train, motorcycle, bicycle, and/or any other type of object classification. Additionally, the system(s) may use the map to generate labels for one or more of the objects depicted by the image, such as the traffic objects (e.g., road boundary, road markings, etc.). As described in more detail herein, the system(s) may use localization and/or three-dimensional (3D) to two-dimensional (2D) projection to project the labels from the map to the image.

The system(s) may then use the classifications and the labels to determine whether portions of the image are associated with occluded traffic objects. For instance, the system(s) may use the labels to determine that a portion (e.g., a pixel) of the image is associated with a traffic object, such as a road boundary or lane marking. The system(s) may then determine whether the traffic object is occluded at the portion of the image using the classification associated with the portion of the image. In some examples, the system(s) may determine that the traffic object is not occluded at the portion of the image based at least on the classification corresponding to (e.g., being similar to) the label of the traffic object or determine that the traffic object is occluded at the portion of the image based at least on the classification not corresponding to (e.g., being different than) the label.

For a first example, if the traffic object includes a road boundary, then the system(s) may determine that the road boundary is not occluded at the portion of the image based at least on the classification including one or more first classifications, such as road or sidewalk, or determine that the road boundary is occluded at the portion of the image based at least on the classification including one or more second classifications, such as pole, vegetation, truck, car, train, person, and/or so forth (e.g., any classification that is different than the first classification(s)). For a second example, if the traffic object includes a traffic sign, then the system(s) may determine that the traffic sign is not occluded at the portion of the image based at least on the classification including one or more first classifications, such as traffic sign, or determine that the traffic sign is occluded at the portion of the image based at least on the classification including one or more second classifications, such as vegetation, truck, car, train, person, and/or so forth.

The system(s) may then continue to perform these processes for one or more additional portions of the image, such as the additional portion(s) that is labeled as being associated with one or more additional traffic objects (e.g., pixels that are labeled as road markings, road boundaries, etc.). Additionally, the system(s) may generate data (referred to, in some examples, as "first occlusion data") indicating which portions of the image are associated with traffic objects that are occluded and/or which portions of the image are associated with traffic objects that are not occluded. In some examples, and for a portion of the image that is associated with an occluded traffic object, the first occlusion data may further indicate whether the occlusion is caused by a dynamic object (e.g., a car, truck, bus, train, motorcycle, bicycle, person, etc.) or caused by a static object (e.g., traffic light, traffic sign, vegetation, terrain, fence, wall, building, etc.). Additionally, the system(s) may continue to perform these processes for one or more additional images represented by the image data.

In addition to, or alternatively from, using the image processing technique, in some examples, the system(s) may use a point cloud processing technique to determine portions of images that are associated with occluded traffic objects located within the environment. For instance, and again for an image, the system(s) may determine a portion (e.g., a pixel) of the image that is associated with a traffic object, such as by using the classification, the labeling, and/or any other technique. The system(s) may then determine, using a map, 3D coordinates associated with a point within the environment that is associated with the portion of the image. Additionally, the system(s) may use the 3D coordinates to determine a first distance associated with the portion of the image (e.g., a distance between a machine that generated the image data and the point located within the environment).

The system(s) may also generate point cloud data (e.g., a 3D occupancy grid) representing points within the environment. In some examples, the system(s) generates the point cloud data using a point cloud map representing initial points within the environment and/or LiDAR data generated using one or more LiDAR sensors of the machine. For example, the system(s) may generate the point cloud data by combining at least a portion of the points represented by the point cloud map with at least a portion of the points represented by the LiDAR data. The system(s) may then determine a second distance associated with the portion of the image (e.g., another distance between the machine and the point located within the environment) using the point cloud data. For example, the system(s) may project multiple rays from the portion of the image towards the point within the environment to determine multiple distances. The system(s) may then determine the second distance using the multiple distances, such as using the smallest distance, the median distance, the mean distance, the maximum distance, and/or any other distance.

The system(s) may then determine whether the traffic object is occluded at the portion of the image using the first distance and the second distance. For example, the system(s) may determine that the traffic object is occluded at the portion of the image based at least on the second distance being within a threshold distance to the first distance or determine that the traffic object is not occluded at the portion of the image based at least on the second distance being outside of the threshold distance to the first distance. In such an example, the system(s) may use one or more techniques to determine the threshold distance. For instance, and as described in more detail herein, the system(s) may determine the threshold distance using at least an incident angle associated with a ray, a depth of ground points associated with the point within the environment, and/or any other factors.

The system(s) may then continue to perform these processes for one or more additional portions of the image, such as the additional portion(s) that is labeled as being associated with one or more additional traffic objects (e.g., pixels that are labeled as road markings, road boundaries, etc.). Additionally, the system(s) may then generate data (referred to, in some examples, as "second occlusion data") indicating which portions of the image are associated with traffic objects that are occluded and/or which portions of the image are associated with traffic objects that are not occluded. Furthermore, the system(s) may continue to perform these processes for one or more additional images represented by the image data.

In some examples, the system(s) may combine the image processing technique and the point cloud processing technique in order to determine portions of images that are associated with occluded traffic objects located within the environment. For instance, and for a portion of an image, the system(s) may use at least the first occlusion data indicating whether the traffic object is occluded at the portion of the image and the second occlusion data also indicating whether the traffic object is occluded at the portion of the image to make a final determination as to whether the traffic object is occluded at the portion of the image. In some examples, the system(s) may use additional data when making the final determination, such as data representing a depth value associated with the 3D point corresponding to the portion of the image and/or an uncertainty value associated with one or more of the label and/or the classification associated with the portion of the image. Techniques for using such data to make the final determination are described in more detail herein.

The system(s) may then perform similar processes in order to generate data (referred to, in some examples, as "final occlusion data") indicating which portions of the image are associated with traffic objects that are occluded and/or which portions of the image are associated with traffic objects that are not occluded. Similar to the first occlusion data, in some examples, the final occlusion data may further indicate whether the occlusion is caused by a dynamic object (e.g., a car, truck, bus, train, motorcycle, bicycle, person, etc.) or caused by a static object (e.g., traffic light, traffic sign, vegetation, terrain, fence, wall, building, etc.). The system(s) may then continue to perform these processes to generate final occlusion data for one or more additional images represented by the image data.

Although primarily described with respect to traffic or other road or automotive related features and objects, the processes described herein may be used to identify occluded features from map data, blueprint data, schematic data, and/or other data representing an environment, space, area, region, building, etc. for any types of features or objects in order to more efficiently and accurately identify quality images or other sensor data representations and corresponding ground truth data.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing large language models (LLMs), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

Figure 1B:
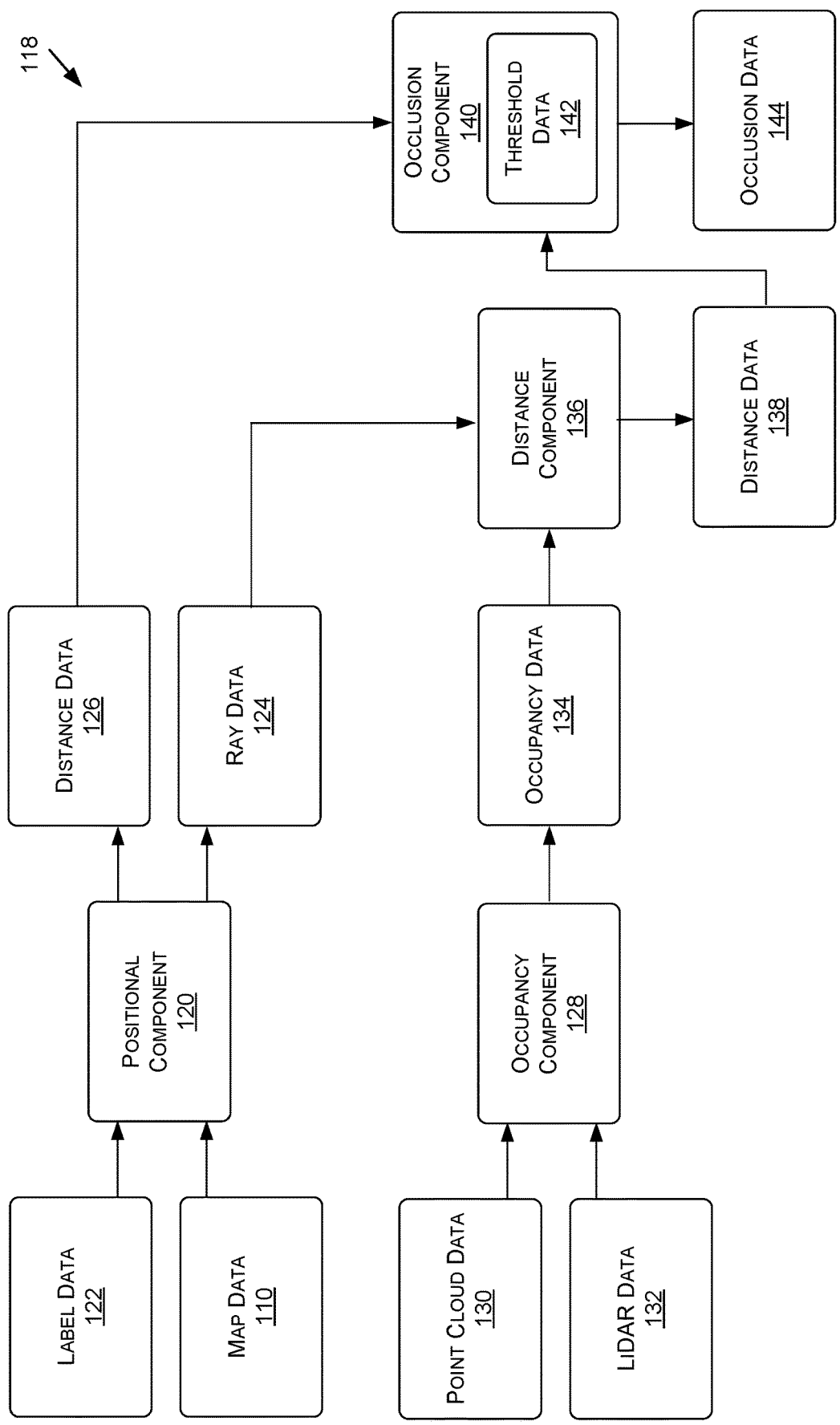

With reference to FIGS. 1A-1C, FIGS. 1A-1C illustrate example data flow diagrams for processes of detecting occluded objects within images, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1200 of FIGS. 12A-12D, example computing device 1300 of FIG. 13, and/or example data center 1400 of FIG. 14.

More specifically, FIG. 1A illustrates an example data flow diagram for a process 100 of detecting occluded objects within images using one or more image processing techniques. As shown, the process 100 may include a classification component 102 receiving image data 104 representing one or more images depicting an environment. As described herein, in some examples, the classification component 102 may receive the image data 104 from one or more machines navigating within the environment, such as the vehicle 1200, while, in other examples, the classification component 102 may receive the image data 104 from any other source. The process 100 may then include the classification component 102 processing the image data 104 using one or more models that are associated with object segmentation and/or object classification. For example, the model(s) may include one or more machine learning models, one or more neural networks, one or more segmentation models, one or more classification models, one or more perception models, and/or any other type of model trained to perform object segmentation and/or classification.

In some examples, the model(s) may be trained to label objects using one or more classifications. As described herein, a classification may include, but is not limited to, road, sidewalk, building, wall, fence, pole, traffic light, traffic sign, vegetation, terrain, sky, person, rider, car, truck, bus, train, motorcycle, bicycle, and/or any other type of object classification. The process 100 may then include the classification component 102 generating and/or outputting classification data 106 representing the classifications associated with the objects. For instance, and for an image represented by the image data 104, the classification data 106 may represent classification masks associated with various portions (e.g., pixels, regions, tiles, blocks, etc.) of the image. For example, the classification data 106 may represent first pixels that are associated with a first classification (e.g., roads), second pixels that are associated with a second classification (e.g., sidewalk), third pixels that are associated with a third classification (e.g., car), and/or so forth.

In some examples, when describing object classifications and/or labels, the objects may be grouped into one or more groups. For a first example, a traffic object may include, but is not limited to, a road, a road boundary, a sidewalk, a road marking, a traffic pole, a traffic sign, a traffic signal, and/or any other type of object associated with navigating machines within an environment. For a second example, a driving surface may include, but is not limited to, a road, a road boundary, a road marking, a parking surface, and/or any other object associated with surfaces for which machines may navigate. For a third example, a dynamic object may include, but is not limited to, a person, a rider, a car, a truck, a bus, a train, a motorcycle, a bicycle, and/or any other object that may be associated with motion. For a fourth example, a static object may include, but is not limited to, a road, a sidewalk, a building, a wall, a fence, a pole, a traffic light, a traffic sign, terrain, and/or any other object that is not associated with motion.

Figure 2:
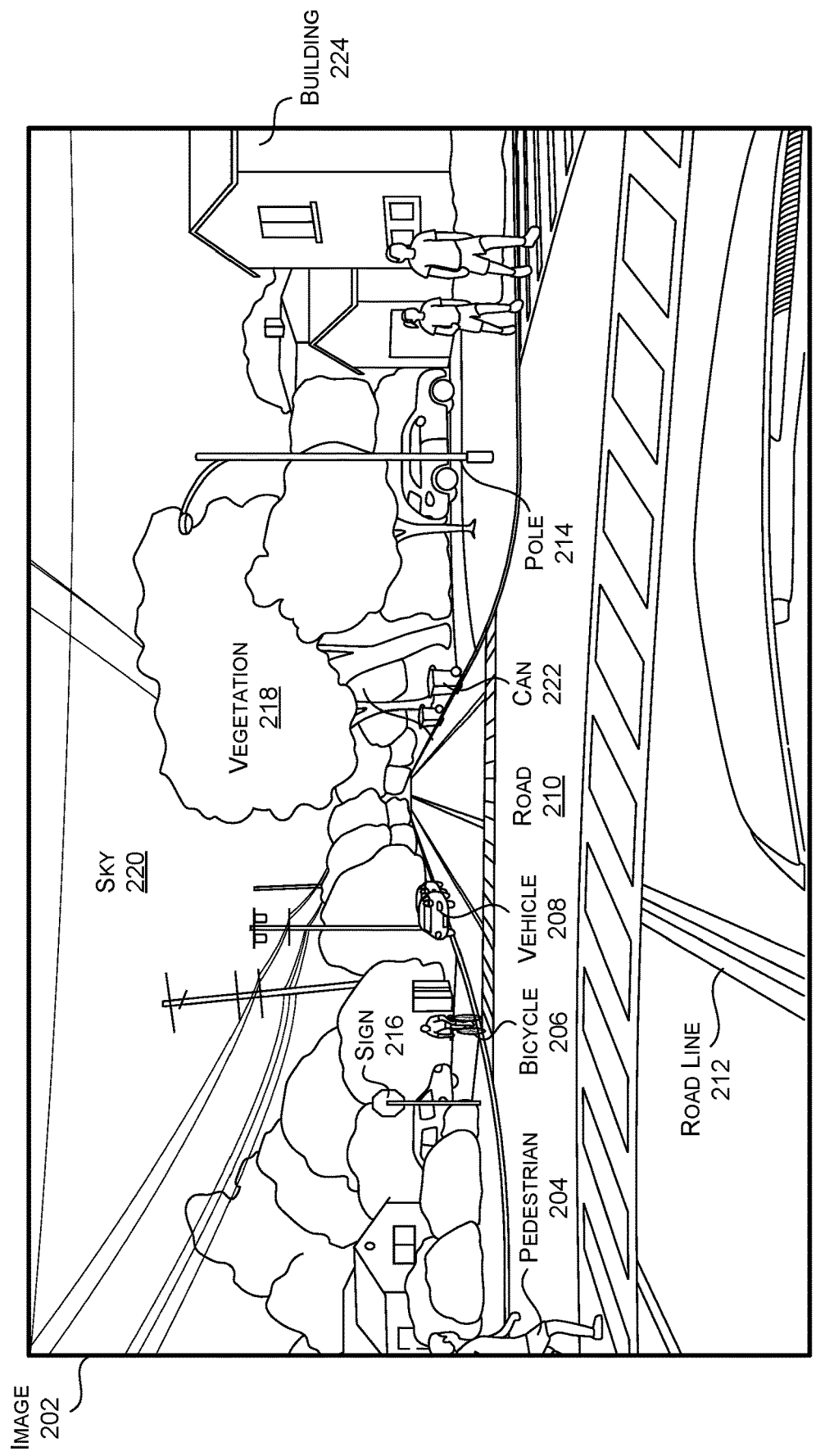
FIG. 2 illustrates an example of an image that has been segmented in order to determine classifications associated with objects depicted by the image, in accordance with some embodiments of the present disclosure.

For instance, FIG. 2 illustrates an example of an image 202 that has been segmented in order to determine classifications associated with objects depicted by the image 202, in accordance with some embodiments of the present disclosure. As shown, the classification component 102 may have analyzed image data (e.g., image data 104) representing the image 202 in order to classify objects as pedestrians 204 (although only one is labeled for clarity reasons), bicycle 206, vehicles 208 (although only one is labeled for clarity reasons), road 210, road lines 212 (although only one is labeled for clarity reasons), pole 214, traffic sign 216, vegetation 218 (although only one is labeled for clarity reasons), sky 220, cans 222 (although only one is labeled for clarity reasons), and buildings 224 (although only one is labeled for clarity reasons).

The classification component 102 may then generate classification data (e.g., classification data 106) representing the classifications associated with the objects. For instance, the classification data may represent masks indicating the classifications associated with the objects. For example, the classification data may represent pixel locations associated the pedestrians 204, pixel locations associated with the bicycle 206, pixel locations associated with the vehicles 208, pixel locations associated with the road 210, pixel locations associated with the road lines 212, pixel locations associated with the pole 214, pixel locations associated with the traffic sign 216, pixel locations associated with the vegetation 218, pixel locations associated with the sky 220, pixel locations associated with the cans 222, and/or pixel locations associated with the buildings 224.

Referring back to the example of FIG. 1A, the process 100 may include a projection component 108 receiving map data 110 representing at least a portion of the environment associated with the image data 104. For example, the map data 110 may represent labels and three-dimensional (3D) locations of objects located within the environment, such as roads, road lines, road boundaries, traffic poles, traffic signs, traffic signals, and/or any other type of traffic object located within the environment. As described herein, a 3D location may include coordinate locations, such as a x-coordinate location, a y-coordinate location, and a z-coordinate location. The projection component 108 may then project the 3D locations associated with the objects to the two-dimensional (2D) locations associated with the images represented by the image data 104. As described herein, a 2D location may include a pixel location, coordinates (e.g., a x-coordinate location and a y-coordinate location), and/or any other type of location associated with a portion of an image. Based at least on the projecting, the projection component 108 may generate labels for at least a portion of the objects depicted by the images using the labels from the map data 110, where the generated labels may be represented by projected label data 112.

For example, and for an image, the projection component 108 may localize a machine that generated the image data 104 representing the image with respect to the map represented by the map data 110. In some examples, the projection component 108 may use any technique to localize the machine, such as by using sensor data (e.g., location data, image data, LiDAR data, RADAR data, etc.) generated using the machine. For example, the projection component 108 may localize the machine by determining an initial pose of the machine using first sensor data generated using one or more location sensors of the machine, such as a Global Positioning System (GPS). The projection component 108 may then refine and/or update the initial pose of the machine using second sensor data generated using one or more other sensors of the machine, such as one or more image sensors, one or more LiDAR sensors, one or more RADAR sensors, and/or the like. For instance, to refine the initial pose, the projection component 108 may compare one or more features represented by the second sensor data to one or more features represented the map. Based at least on the comparing, the projection component 108 may update the initial pose of the machine to an estimated pose (e.g., a localization pose) of the machine within the environment. As described herein, a pose may represent a location (e.g., a x-coordinate location, a y-coordinate location, and/or a z-coordinate location) of the machine, an orientation (e.g., a yaw, a pitch, and/or a roll) of the machine, and/or any other location, pose, or orientation information.

Based at least on the localization, the projection component 108 may then project the 3D locations associated with the objects to the 2D locations associated with the image, using one or more techniques. Additionally, the projection component 108 may use the labels associated with the projected objects to generate corresponding labels for the objects as depicted by the image. For a first example, if the projection component 108 projects 3D coordinates for a road to 2D coordinates of the image, then the projection component 108 may generate a label that indicates "road" for the 2D coordinates (e.g., pixels) of the image. For a second example, if the projection component 108 projects 3D coordinates for a traffic line to 2D coordinates of the image, then the projection component 108 may generate a label that indicates "traffic line" for the 2D coordinates (e.g., pixels) of the image.

Figure 3:
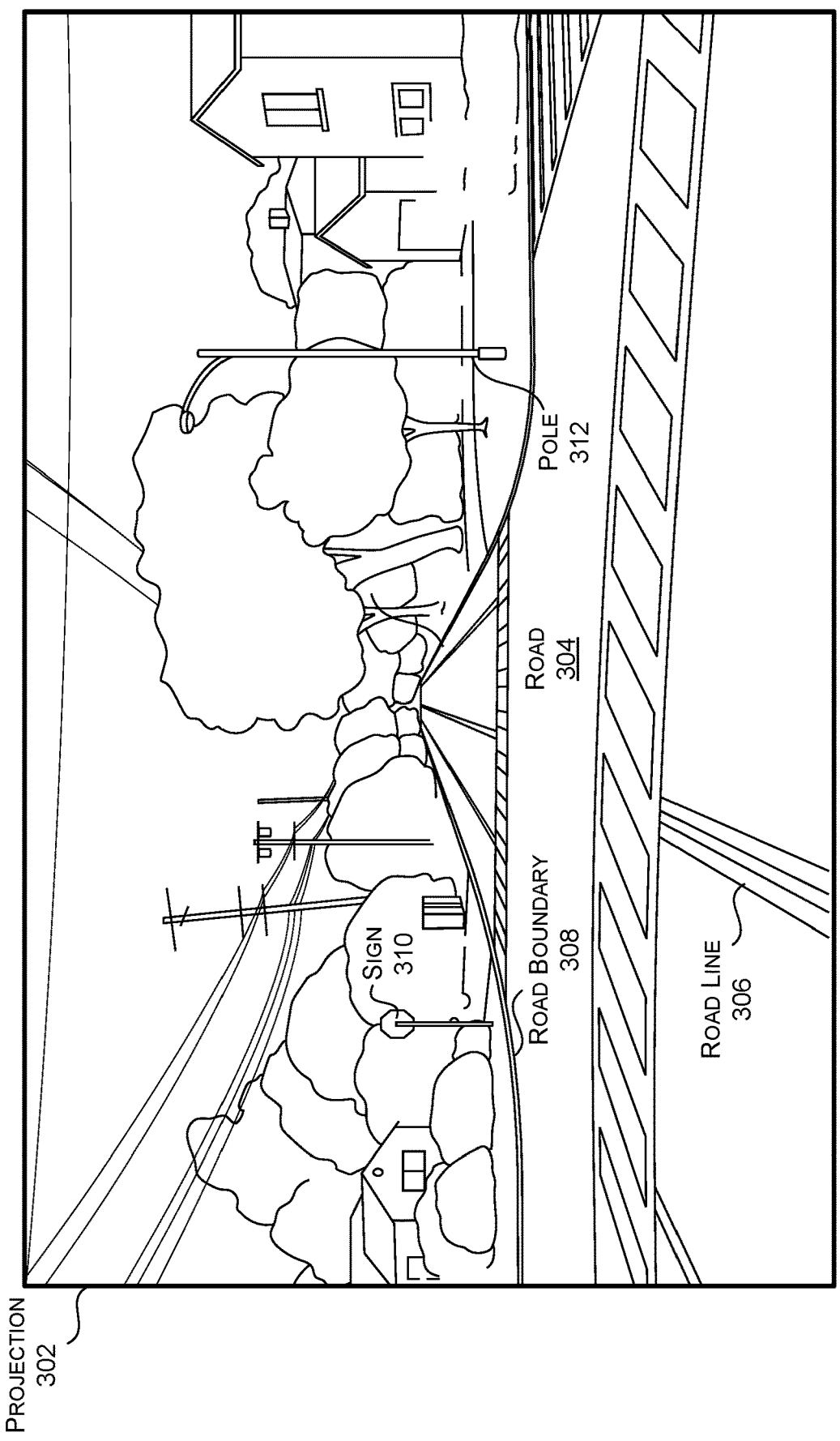
FIG. 3 illustrates an example of projecting three-dimensional locations of objects from a map to two-dimensional locations of an image, in accordance with some embodiments of the present disclosure.

For instance, FIG. 3 illustrates an example of projecting 3D locations of objects from a map (which may be represented by the map data 110) to 2D locations of the image 202, in accordance with some embodiments of the present disclosure. As shown, based at least on performing a projection 302, the projection component 108 may generate labels for at least roads 304 (although only one is labeled for clarity reasons), road lines 306 (although only one is labeled for clarity reasons), road boundaries (although only one is labeled for clarity reasons), a traffic sign 310, and a traffic pole 312. However, in other examples, the projection component 108 may use the map to generate labels for additional and/or alternative objects depicted by the image 202.

Referring back to the example of FIG. 1A, the process 100 may include an occlusion component 114 using the classification data 106 and the projected label data 112 to determine whether traffic objects (and/or other types of objects) are occluded at various portions of images. For instance, and for an image, the occlusion component 114 may use the projected label data 112 to determine that a portion (e.g., a pixel) of the image is associated with a traffic object, such as a road line or a road boundary. The occlusion component 114 may then use the classification data 106 to determine a classification associated with the portion of the image. Additionally, the occlusion component 114 may use the classification to determine whether the traffic object is occluded at the portion of the image. In some examples, the occlusion component 114 may determine that the traffic object is not occluded at the portion of the image based at least on the classification corresponding to (e.g., being similar to) the label of the traffic object or determine that the traffic object is occluded at the portion of the image based at least on the classification not corresponding to (e.g., being different than) the label.

For a first example, if a label for a traffic object indicates a road boundary, then the occlusion component 114 may determine that the traffic object is not occluded at the portion of the image when a classification includes one or more first classifications (e.g., road or sidewalk) corresponding to road boundaries or determine that the traffic object is occluded at the portion of the image when the classification includes one or more second classifications (e.g., car, vegetation, person, etc.) not corresponding to road boundaries. In some embodiments, where there is no classification for the image as determined using a machine learning model (such as a machine learning model trained to detect dynamic objects such as cars, pedestrians, etc.), and the label from the map data indicates a lane line or road boundary or other feature or object of interest, then the feature or object may be determined not to be occluded. For another example, if a label for a traffic object indicates a traffic sign, then the occlusion component 114 may determine that the traffic object is not occluded at the portion of the image when the classification includes one or more first classifications (e.g., traffic sign) corresponding to traffic signs or determine that the traffic object is occluded at the portion of the image when the classification includes one or more second classifications (e.g., car, vegetation, person, etc.) not corresponding to traffic signs.

In some examples, the occlusion component 114 may perform similar processes for one or more additional portions of the image. For example, the occlusion component 114 may perform similar processes for the portions (e.g., pixels) of the image that are associated with traffic objects. Additionally, the process 100 may include the occlusion component 114 generating occlusion data 116 indicating portions of the image for which traffic objects are occluded and/or portions of the image for which traffic objects are not occluded. For example, and for a portion of the image, the occlusion data 116 may represent one of a first label indicating that the traffic object is not occluded, a second label indicating that the traffic object is occluded, a third label indicating that the traffic object is occluded by a dynamic object, a fourth label indicating that traffic object is occluded by a static object, and/or any other label. In some examples, the process 100 may then continue to repeat for one or more additional images represented by the image data 104.

For instance, FIG. 4A illustrates an example of determining whether a traffic object is occluded at a portion of an image, in accordance with some embodiments of the present disclosure. In the example of FIG. 4A, the occlusion component 114 may be analyzing a portion 402 of the projection 302 with respect to a portion 404 of the image 202. For a first example, the occlusion component 114 may determine that a first point 406(1) (e.g., a first pixel) associated with the image 202 is associated with a first point label 408(1) for road boundary 308. The occlusion component 114 may then determine that the road boundary 308 is occluded at the first point 406(1) based at least on the first point 406(1) being classified as the vehicle 208 in the image 202. For a second example, the occlusion component 114 may determine that a second point 406(2) (e.g., a second pixel) associated with the image 202 is also associated with a second point label 408(2) for road boundary 308. The occlusion component 114 may then determine that the road boundary 308 is not occluded at the second point 406(2) based at least on the second point 406(2) being classified as the road 210 in the image 202. The occlusion component 114 may then perform similar processes for one or more additional points associated with the image 202.

Figure 4B:
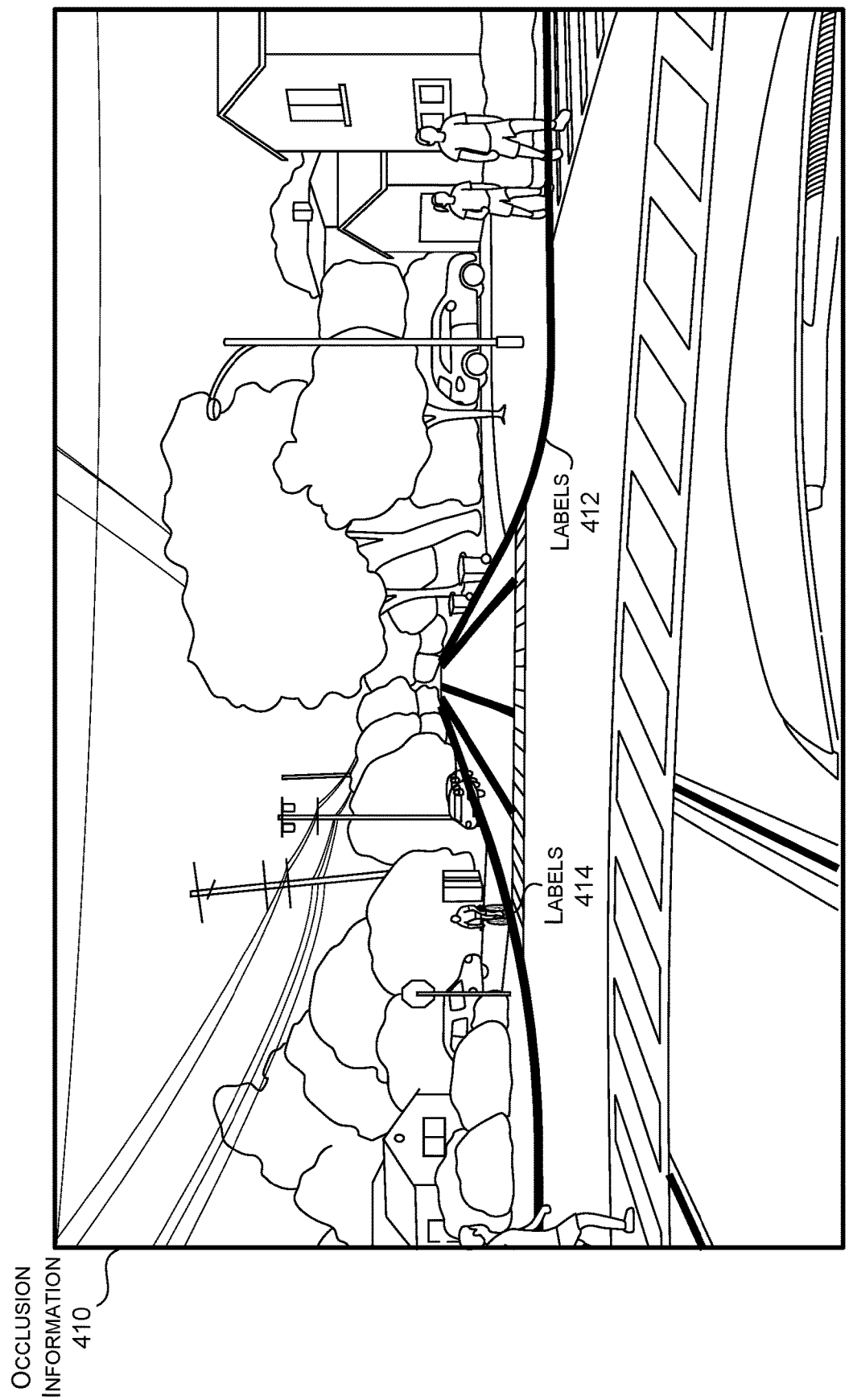
FIG. 4B illustrates an example of generating occlusion information associated with an image, in accordance with some embodiments of the present disclosure.

Next, FIG. 4B illustrates an example of generating occlusion information 410 (which may be represented by the occlusion data 116) associated with the image 202, in accordance with some embodiments of the present disclosure. As shown, the occlusion information 410 may include first labels 412 (although only one is labeled for clarity reasons) for traffic objects (e.g., road boundaries and road lines) that are not occluded within the image 202, where the first labels 412 include the dark lines within the occlusion information 410. Additionally, the occlusion information 410 may include second labels 414 (although only one is labeled for clarity reasons) for traffic objects (e.g., road boundaries and road lines) that are occluded within the image 202, where the second labels 414 include the grey lines within the occlusion information 410.

FIG. 1B illustrates an example data flow diagram for a process 118 of detecting occluded objects within images using one or more point cloud processing techniques. The process 118 may include a positional component 120 receiving label data 122 and the map data 110 (although, in some examples, the map data 110 may include the label data 122). In some examples, the label data 122 may represent labels projected onto an image (e.g., using one or more of the processes described herein with respect to FIG. 1A) and/or labels of 3D points within the environment as represented by the map data 110. For an image, the positional component 120 may then the localize the machine that generated the image data 104 representing the image with respect to the map, using one or more of the processes described herein (e.g., the sensor data generated using the machine). The positional component 120 may then project a 3D location (e.g., 3D coordinates) for a point from the map that is associated with a traffic object to a 2D location for a portion (e.g., pixel) of the image.

The positional component 120 may then use the projection to determine information associated with the portion of the image. For example, the positional component 120 may determine at least a ray that is projected from the portion (e.g., the 2D location of the pixel) of the image to the 3D location of the point within the environment. Additionally, the positional component 120 may generate ray data 124 representing information associated with the ray, such as the 2D image location, the direction, the label (e.g., traffic object label), and/or any other information associated with the ray. The positional component 120 may also determine a distance between the 2D image location and the 3D location of the point within the environment. Additionally, the positional component 120 may generate distance data 126 representing the distance. The positional component 120 may then perform similar processes for one or more other portions of the image.

For instance, FIG. 5 illustrates an example of projecting a 3D location associated with a point within an environment to a 2D location associated with a portion of the image 202 and then using the projection to determine information associated with the portion of the image 202, in accordance with some embodiments of the present disclosure. As shown, the positional component 120 may use a map 502 (where FIG. 5 represents a simplified map for illustrated purposes) to project a 3D location 504 associated with the point within the environment to a 2D location 506 associated with a portion (e.g., a pixel) of the image 202, which is represented by projection 508. As described herein, the 3D location 504 may include at least a x-coordinate location, a y-coordinate location, and a z-coordinate location associated with the point. Additionally, the 2D location may include a x-coordinate location and a y-coordinate location associated with the portion of the image 202. As described herein, in some examples, the positional component 120 may use any technique to perform the projections 508.

The positional component 120 may then determine information associated with the portion of the image 202. For instance, the positional component 120 may determine at least a ray that is projected from the 2D location 506 associated with the image 202 to the 3D location 504 associated with the point within the environment, where the ray may also be represented by the projection 508. Additionally, the positional component 120 may generate data (e.g., ray data 124) representing information associated with the ray, such as the 2D location 506, the direction, the label (e.g., traffic object label), and/or any other information associated with the ray. The positional component 120 may also determine a distance using the 2D location 506 associated with the image 202 and the 3D location 504 associated with the point within the environment, which may be represented by the length of the projection. Additionally, the positional component 120 may generate data (e.g., distance data 126) representing the distance. The positional component 120 may then perform similar processes for one or more other portions of the image 202.

Referring back to the example of FIG. 1B, the process 118 may include an occupancy component 128 receiving point cloud data 130 and/or LiDAR data 132. As described herein, the point cloud data 130 may represent a point cloud (e.g., a point cloud map, an occupancy map, etc.) associated with the environment. For instance, the point cloud data 130 may be generated using LiDAR data (and/or other types of distance data, such as RADAR data) that is generated using one or more machines when navigating within the environment. For example, the LiDAR data from the machine(s) may be combined to generate the point cloud data 130 that represents points within the environment. By combining the LiDAR data from multiple drives associated with the machine(s) within the environment, the point cloud data 130 may represent a dense number of points within the environment.

The LiDAR data 132 may then be generated using the machine when navigating within the environment, where the machine also generated the image data 104 that is being processed for traffic object occlusion. For instance, the machine may have generated the LiDAR data 132 using one or more LiDAR sensors while also generating the image data 104 using one or more image sensors. As such, the LiDAR data 132 may better represent the current occupancy associated with the environment since the LiDAR data 132 may represent the current locations of objects within the environment, such as dynamic objects that may change over different time instances.

As shown, the process 118 may then include the occupancy component 128 using the point cloud data 130 and/or the LiDAR data 132 to generate occupancy data 134 associated with the environment. For instance, and as described herein, the occupancy data 134 may represent the occupancy associated with the environment at a time that is approximate to a time when the image being processed was generated. For instance, the occupancy data 134 may represent points within the environment that are associated with the objects located within the environment at the approximate time when the image was generated. In some examples, the occupancy component 128 may generate the occupancy data 134 by at least updating the point cloud data 130 using the LiDAR data 132.

For example, the occupancy component 128 may insert at least a portion of the points represented by the LiDAR data 132 into the point cloud data 130. In some examples, if a point that is inserted into the point cloud data 130 is further in distance than an initial point represented by the point cloud data 130 and in the same direction as the initial point, then the occupancy component 128 may remove the initial point from the point cloud data 130. This is because the object for which the initial point was associated (e.g., reflected off) may no longer be located within the environment. As such, by removing the initial point, the occupancy data 134 may indicate that the area of the environment associated with the initial point is no longer occupied by the object. In other words, the occupancy component 128 may generate the occupancy data 134 by updating the point cloud data 130 to indicate the current locations of objects that are currently located within the environment at the time the image generated.

Figure 6:
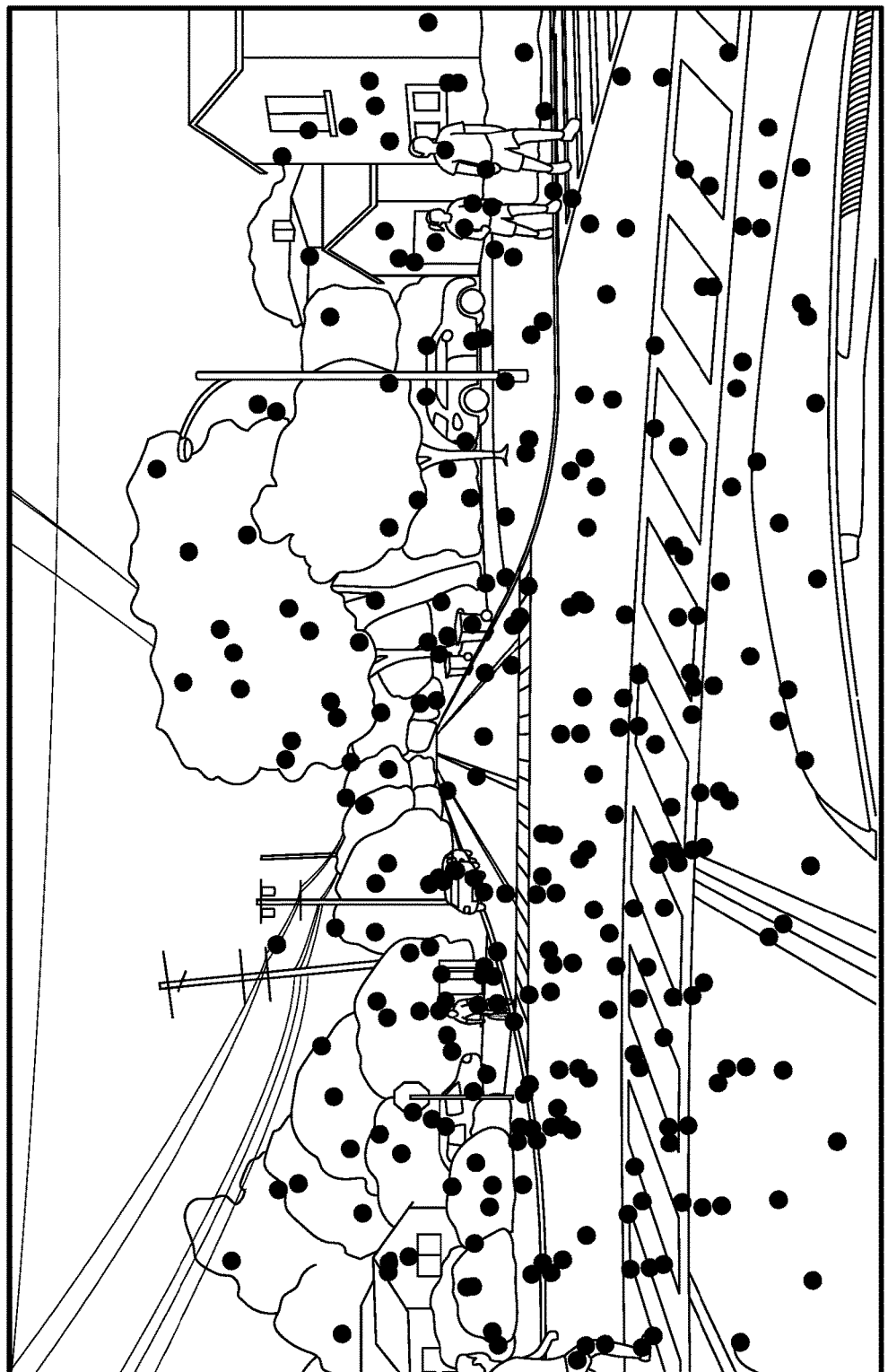
FIG. 6 illustrates an example of an occupancy map that may be generated using point cloud data and LiDAR data, in accordance with one or more embodiments of the present disclosure.

For instance, FIG. 6 illustrates an example of an occupancy map 602 that may be generated using point cloud data (e.g., the point cloud data 130) and LiDAR data (e.g., the LiDAR data 132), in accordance with one or more embodiments of the present disclosure. As shown, the occupancy map 602 may include a number of points 604 (although only one is labeled for clarity reasons), where at least a portion of the points is from the point cloud data and at least a portion of the points is from the LiDAR data. For instance, the points 604 that are associated with static objects, such as the road 210, the road line 212, the traffic pole 214, the traffic sign 216, and buildings 224, may come from the point cloud data and/or the LiDAR data. However, the points 604 that are associated with the dynamic objects, such as the vehicles 208, the pedestrians 204, the bicycle 206, and the cans 222, may come from the LiDAR data. While the example of FIG. 6 illustrates the occupancy map 602 as including a specific number of points 604, in other examples, the occupancy map 602 may include a lesser number of points or a greater number of points.

Referring back to the example of FIG. 1B, the process 118 may include a distance component 136 using at least the ray data 124 and the occupancy data 134 to determine distances to points within the environment. For instance, and for a portion (e.g., a pixel) of the image, the distance component 136 may analyze the ray data 124 to determine the 2D location associated with the portion of the image (e.g., the 2D location of the pixel within the image). The distance component 136 may then project one or more rays from the 2D location to the occupancy map represented by the occupancy data 134. As described herein, the number of rays may include, but is not limited to, one ray, two rays, five rays, ten rays, fifty rays, and/or any other number of rays. The distance component 136 may then use the ray(s) to determine a distance (e.g., a ray casting depth) from the 2D location to a point from the occupancy map.

For example, the distance component 136 may determine one or more distances associated with one or more of the ray(s), such as a respective distance for each ray. The distance component 136 may then use the distance(s) to determine a final distance associated with the 2D location. In some examples, the occupancy component 136 may determine the final distance as the largest distance among the distance(s). However, in other examples, the distance component 136 may determine the final distance as the smallest distance, the mean of the distance(s), the median of the distance(s), and/or using any other technique. The distance component 136 may then generate distance data 138 representing the final distance associated with the 2D location within the image. Additionally, the distance component 136 may perform similar processes to generate distance data 138 associated with one or more additional portions of the image.

The process 118 may then include an occlusion component 140 using the distance data 126 and the distance data 138 to determine whether traffic objects (and/or other types of objects) are occluded at various portions of images. For instance, and for an image, the occlusion component 140 may use the distance data 126 to determine a first distance (e.g., the distance determined using the map data 110) associated with a portion (e.g., a pixel) of the image, where the portion of the image is associated with a traffic object. The occlusion component 140 may then use the distance data 138 to determine a second distance (e.g., the distance determined using the occupancy data 134) associated with the portion of the image. The occlusion component 140 may then determine whether the traffic object is occluded at the portion of the image using at least the first distance and the second distance.

For example, the occlusion component 140 may determine that the traffic object is occluded at the portion of the image based at least on the second distance being outside of a threshold distance from the first distance or determine that the traffic object is not occluded at the portion of the image based at least on the second distance being within the threshold distance to the first distance, where the threshold distance may be represented by threshold data 142. In some examples, the occlusion component 140 may use a set threshold distance for points such as, but not limited to, 0.1 meters, 0.5 meters, 1 meter, and/or any other distance. However, in other examples, the occlusion component 140 may dynamically determine a threshold distance to use for the portion of the image. In such examples, the occlusion component 140 may determine the threshold distance using one or more factors, such as an incident angle associated with the projected ray and a ground thickness (e.g., an average ground point cloud thickness).

Figure 7:
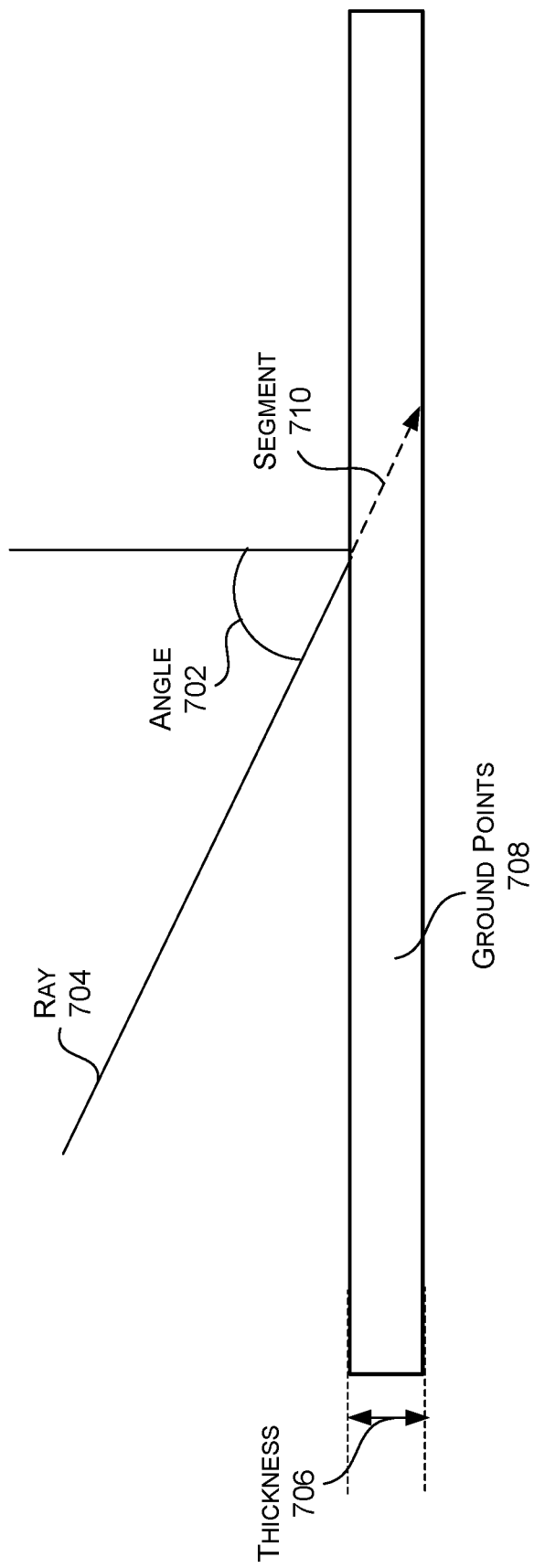
FIG. 7 illustrates an example of determining a threshold distance associated with determining whether a portion of an image is occluded, in accordance with some embodiments of the present disclosure.

For instance, FIG. 7 illustrates an example of determining a threshold distance associated with determining whether a portion of an image is occluded, in accordance with some embodiments of the present disclosure. As shown, the occlusion component 140 may determine an angle 702 associated with a ray 704 that is cast from the portion of the image and a thickness 706 associated with ground points 708 from an occupancy map (e.g., which may be represented by the occupancy data 134). The occlusion component 140 may then determine the threshold distance using the angle 702 and the thickness 706. For instance, and in the example of FIG. 7, the occlusion component 140 may determine the threshold distance to include a length of a segment 710 of the ray 704 that is within the ground points 708. However, in other examples, the occlusion component 140 may determine the threshold distance using any other technique.

Figure 8:
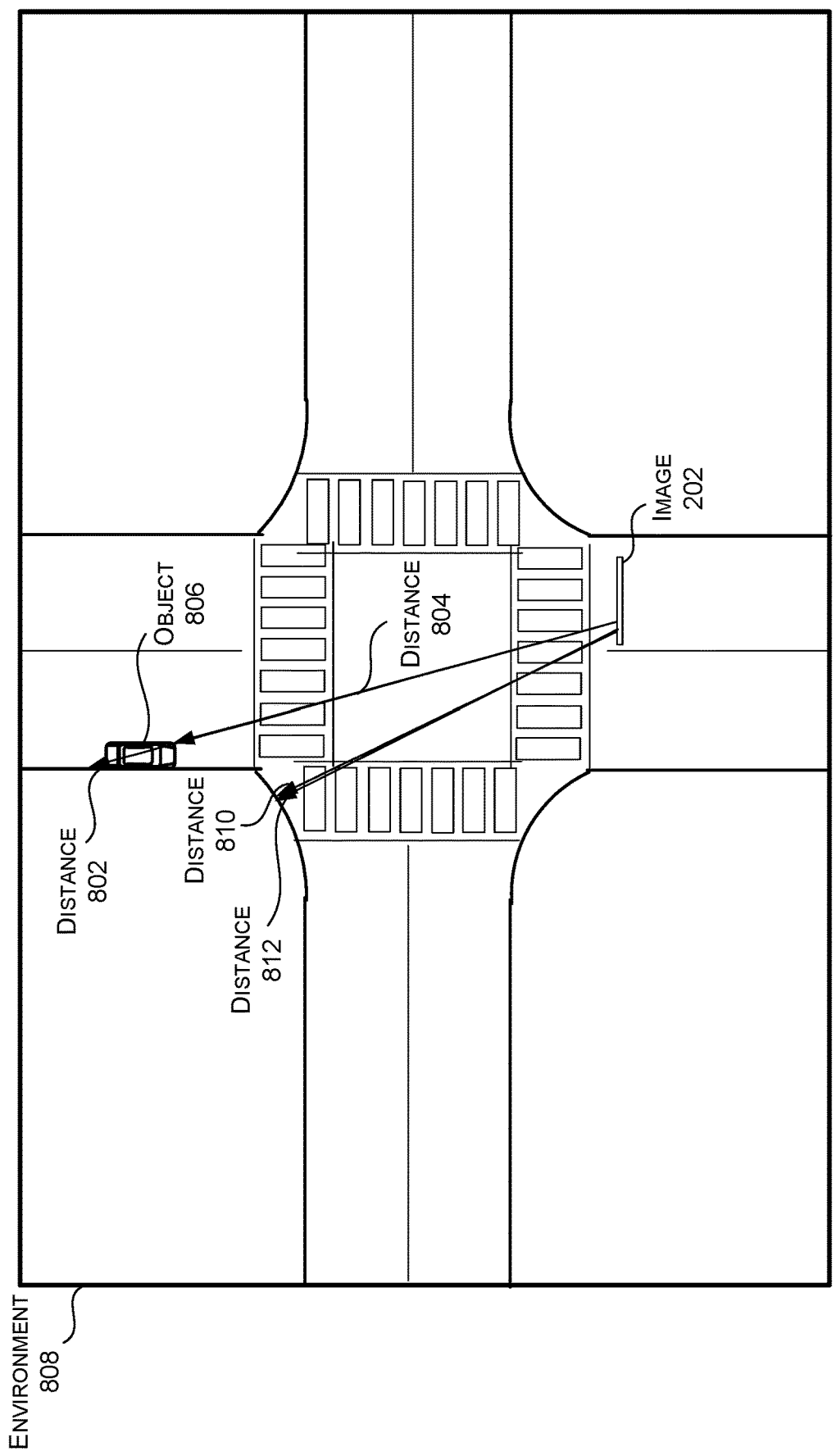
FIG. 8 illustrates an example of determining whether traffic objects are occluded at portions of an image, in accordance with some embodiments of the present disclosure.

Additionally, FIG. 8 illustrates an example of determining whether traffic objects are occluded in portions of the image 202, in accordance with some embodiments of the present disclosure. As shown, the occlusion component 140 may determine a first distance 802 associated with a first portion of the image 202 using first distance data (e.g., the distance data 126) and a second distance 804 associated with the first portion of the image 202 using second distance data (e.g., the distance data 138). The occlusion component 140 may also perform one or more of the processes described herein to determine a first threshold distance associated with the first portion of the image 202. Additionally, the occlusion component 140 may then determine that a traffic object (e.g., a road boundary) is occluded at the first portion of the image 202 based at least on the second distance 804 being outside of the first threshold distance to the first distance 802. As shown, the traffic object may be occluded based on an object 806 (which may correspond to the vehicle 208) located within an environment 808 associated with the image 202.

Additionally, the occlusion component 140 may determine a first distance 810 associated with a second portion of the image 202 using first distance data (e.g., the distance data 126) and a second distance 812 associated with the second portion of the image 202 using second distance data (e.g., the distance data 138). The occlusion component 140 may also perform one or more of the processes described herein to determine a threshold distance associated with the second portion of the image 202. Additionally, the occlusion component 140 may then determine that a traffic object (e.g., a road boundary) is not occluded at the second portion of the image 202 based at least on the second distance 812 being within the second threshold distance to the first distance 810.

While the example of FIG. 8 only illustrates the object 806 which may correspond to the vehicle 208 depicted by the image 202 for clarity reasons, in other examples, the environment 808 may include, but is not limited to, each of the objects depicted by the image 202.

Referring back to the example of FIG. 1B, the process 118 may include the occlusion component 140 generating occlusion data 144 indicating portions of the image for which traffic objects are occluded and/or portions of the image for which traffic objects are not occluded. For example, and for a portion of the image, the occlusion data 144 may represent one of a first label indicating that the traffic object is not occluded, a second label indicating that the traffic object is occluded, a third label indicating that occlusion could not be determined, and/or any other label. In some examples, the process 100 may then continue to repeat for one or more additional images represented by the image data 104. Additionally, in some examples, the occlusion data 144 may represent occlusion information similar to the occlusion data 116, such as the occlusion information 410 from the example of FIG. 4B.

In some examples, the process 118 may be performed using one or more techniques in order to optimize the processing performed with respect to the process 118. For instance, the image data 104 being processed may be partitioned into groups (e.g., chunks) using one or more criteria. For a first example, the image data 104 may be portioned based at least on a distance traveled by the machine that generated the image data 104 such that respective groups include images generated by the machine when traveling a set distance. For instance, a first group may include one or more first images that were generated while the machine traveled a first set distance, a second group may include one or more second images that were generated while the machine traveled a second set distance, a third group may include one or more third images that were generated while the machine traveled a third set distance, and/or so forth. In such an example, the set distance may include, but is not limited to, 1 meter, 5 meters, 10 meters, 20 meters, 50 meters, and/or any other distance.

For a second example, the image data 104 may be portioned based at least on a time traveled by the machine that generated the image data 104 such that respective groups include images generated by the machine when traveling a set time. For instance, a first group may include one or more first images that were generated while the machine traveled a first set time, a second group may include one or more second images that were generated while the machine traveled a second set time, a third group may include one or more third images that were generated while the machine traveled a third set time, and/or so forth. In such an example, the set time may include, but is not limited to, 1 second, 10 seconds, 1 minute, 5 minutes, 10 minutes, and/or any other time period. While these are just two example techniques of partitioning the images represented by the image data 104 into groups, in other examples, any other technique may be used to partition the images into groups.

In some examples, the process 118 may then include processing the groups at different time instances. For example, a first group may be processed, followed by processing a second group, followed by processing a third group, and/or so forth. By processing a group at a single time instance, the process 118 may also reduce the amount of the map data 110 and/or the point cloud data 130 that is processed. For example, if the group is associated with a set distance within the environment, then a portion of the map data 110 and/or a portion of the point cloud data 130 that is associated with the set distance may be used during processing without other portions of the map data 110 and/or other portions of the point cloud data 130. By reducing the amount of map data 110 and/or point cloud data 130 needed for processing, the process 118 may again be optimized by reducing the amount of time it takes to process the group of images.

As described herein, in some examples, more than one processing technique may be combined in order to detect occluded objects within images. For instance, FIG. 1C illustrates an example data flow diagram for a process 146 of detecting occluded objects within images using the image processing technique(s) and the point cloud processing technique(s). As shown, an arbitration component 148 may receive at least the occlusion data 116 generated using the image processing technique(s) of FIG. 1A and the occlusion data 144 generated using the point cloud processing technique(s) of FIG. 1B. As described herein, and for an image, the occlusion data 116 may indicate whether traffic objects are occluded at portions of the image and the occlusion data 144 may also indicate whether the traffic objects are occluded at the portions of the image. In some examples, the occlusion data 116 may indicate the same traffic object occlusions as the occlusion data 144. However, in other examples, the occlusion data 116 may indicate one or more different traffic object occlusions as compared to the occlusion data 144.

As shown by the example of FIG. 1C, the process 146 may further include the arbitration component 148 receiving additional data, such as uncertainty data 150 and/or location data 152. As descried herein, the uncertainty data 150 may represent uncertainty values associated with classifying the images using the classification component 102. For example, and for a portion (e.g., a pixel) of an image, a low uncertainty value may indicate a high probability that the classification for the portion of the image is correct while a high uncertainty value may indicate a low probability that the classification for the portion of the image is correct. In some examples, the uncertainty values may be determined using one or more techniques.

For a first example, one or more feature tracking techniques may be used to track feature points between images represented by the image data 104. Classifications associated with the tracked feature points between the images may then be used to determine the uncertainty values. For example, if the classifications between the images are similar for a tracked feature point, then the uncertainty value may be low for those points within the images and if the classifications between the images are different for the tracked point, then the uncertainty value may be high for those points within the images. For a second example, a model, such as a model associated with the classification component 102, may determine the uncertainty values associated with the classifications. While these are just a few example techniques for determining the uncertainty values associated with the classifications, in other examples, additional and/or alternative techniques may be used to determine the uncertainty values.

The location data 152 may indicates one or more coordinates associated with the portions (e.g., pixels) of the images that are labeled and/or classified. As described herein, in some examples, the location data 152 may indicate the z-coordinate locations associated with the portions of the images within the environment. However, in other examples, the location data 152 may further represent the x-coordinate locations and/or the y-coordinate locations associated with the portions of the images.

The process 146 may then include the arbitration component 148 processing the occlusion data 116, the occlusion data 144, the uncertainty data 150, and/or the location data 152 and, based at least on the processing, generating final occlusion data 154 associated with the images. In some examples, the arbitration component 148 may process the data using one or more machine learning models, one or more neural networks, one or more algorithms, one or more rules, and/or so forth that are configured to determine final portions of the images for which traffic objects are occluded and/or final portions of the images for which traffic objects are not occluded.

For a first example, and for a portion of an image, if both the occlusion data 116 and the occlusion data 144 indicate that a traffic object at the portion of the image is occluded, then the arbitration component 148 may generate the final occlusion data 154 to also indicate that the traffic object at the portion of the image is occluded. For a second example, and for a portion of an image, if both the occlusion data 116 and the occlusion data 144 indicate that a traffic object at the portion of the image is not occluded, then the arbitration component 148 may generate the final occlusion data 154 to also indicate that the traffic object at the portion of the image is not occluded.

For a third example, and again for a portion of an image, if the occlusion data 116 differs from the occlusion data 144 on whether a traffic object at the portion of the image is occluded, then the arbitration component 148 may generate the final occlusion data 154 to indicate that the traffic object at the portion of the image is not occluded. For a fourth example, and again for a portion of an image, if the occlusion data 116 again differs from the occlusion data 144 on whether a traffic object at the portion of the image is occluded, then the arbitration component 148 may generate the final occlusion data 154 to indicate that the traffic object at the portion of the image is occluded.

For a fifth example, and again for a portion of an image, if the occlusion data 116 again differs from the occlusion data 144 on whether a traffic object at the portion of the image is occluded, then the arbitration component 148 may generate the final occlusion data 154 to be similar to one of the occlusion data 116 or the occlusion data 144. For instance, if the occlusion data 116 indicates that the traffic object is occluded at the portion of the image and the occlusion data 144 indicates that the traffic object is not occluded at the portion of the image, then the arbitration component 148 may generate the final occlusion data 154 to indicate that the traffic object is occluded at the portion of the image. In some examples, and for this fifth example, the arbitration component 148 may use the uncertainty data 150 and/or the location data 152 when determining whether to use the occlusion data 116 or the occlusion data 144.

For instance, in some examples, the arbitration component 148 may determine to use the occlusion data 116 when the uncertainty value associated with the portion of the image satisfies (e.g., is less than or equal to) a threshold value (e.g., 1%, 5%, 10%, etc.) or determine to not use the occlusion data 144 when the uncertainty value does not satisfy (e.g., is greater than) the threshold value. The arbitration component 148 may make such determinations since the occlusion data 116 may be more reliable with a lower uncertainty value than with a higher uncertainty value. In some examples, the arbitration component 148 may determine to use the occlusion data 116 when the z-coordinate location associated with the portion of the image satisfies (e.g., is equal to or greater than) a threshold distance (e.g., 1 meter, 5 meters, 10 meters, etc.) or determine to use the occlusion data 144 when the z-coordinate value does not satisfy (e.g., is less than) the threshold distance. The arbitration component 148 may make such determinations since a greater z-coordinate value may indicate that the labeled point associated with the portion of the image is not included on the same surface (e.g., road) as the machine and, as such, the occlusion data 116 may be less reliable.

While these are just a few example techniques of how the arbitration component 148 may use the occlusion data 116, the occlusion data 144, the uncertainty data 150, and/or the location data 152 to generate the final occlusion data 154, in other examples, the arbitration component 148 may use additional and/or alternative techniques.

The process 146 may include the arbitration component 148 outputting the final occlusion data 154 indicating portions of the images for which traffic objects are occluded and/or portions of the images for which traffic objects are not occluded. For example, and for a portion of an image, the final occlusion data 154 may represent one of a first label indicating that the traffic object is not occluded, a second label indicating that the traffic object is occluded, a third label indicating that the traffic object is occluded by a dynamic object, a fourth label indicating that traffic object is occluded by a static object, a fifth label indicating that occlusion at the portion of the image may not be determined, and/or any other label. Additionally, in some examples, the occlusion data 154 may represent occlusion information similar to the occlusion data 116, such as the occlusion information 410 from the example of FIG. 4B.

Figure 9:
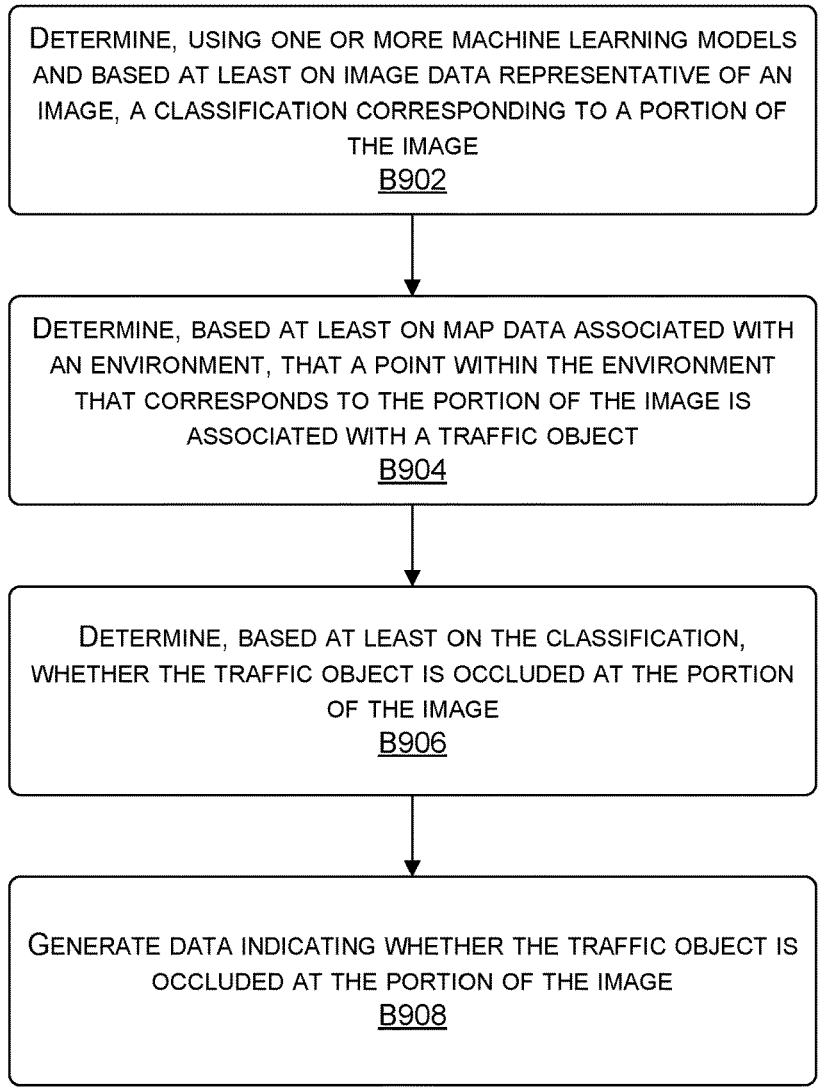
FIG. 9 is a flow diagram showing a method for detecting occluded objects within images using one or more image processing techniques, in accordance with some embodiments of the present disclosure.
Figure 11:
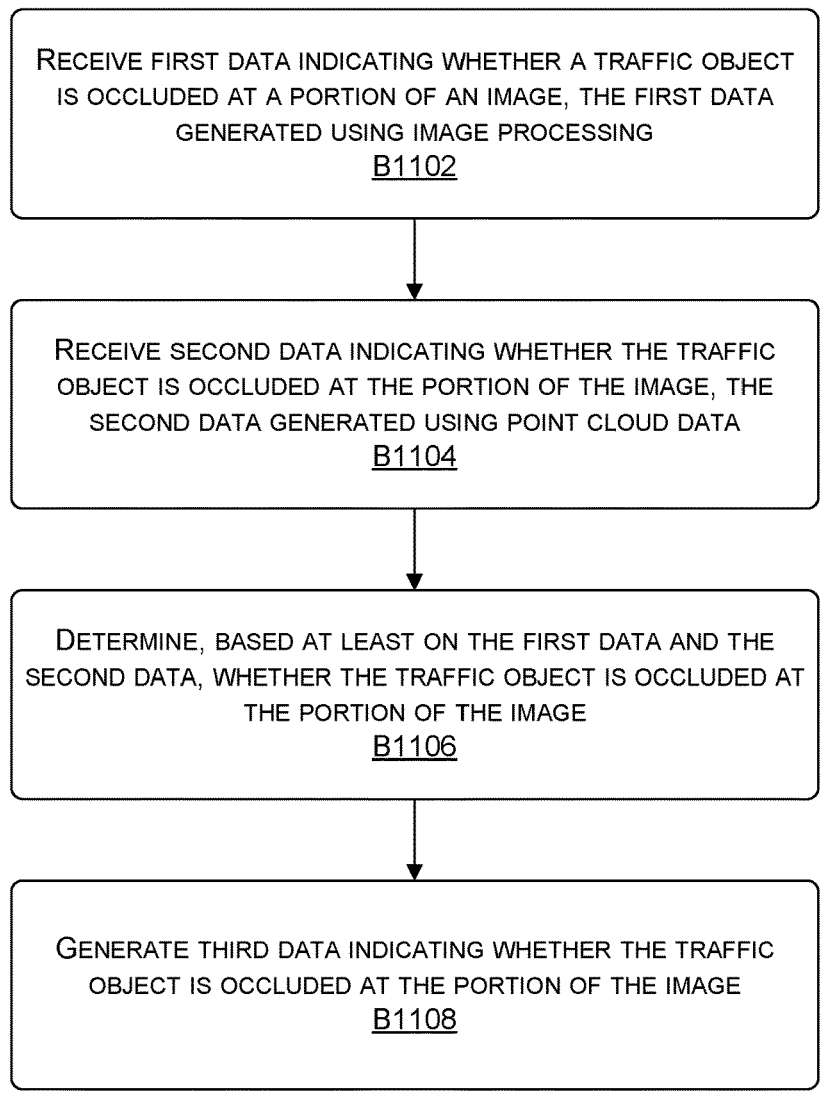
FIG. 11 is a flow diagram showing a method for detecting occluded objects within images using one or more image processing techniques and one or more point cloud techniques, in accordance with some embodiments of the present disclosure.

Now referring to FIG. 9-11, each block of methods 900, 1000, and 1100, described herein, comprises a computing process that may be performed using any combination of hardware, firmware, and/or software. For instance, various functions may be carried out by a processor executing instructions stored in memory. The methods 900, 1000, and 1100 may also be embodied as computer-usable instructions stored on computer storage media. The methods 900, 1000, and 1100 may be provided by a standalone application, a service or hosted service (standalone or in combination with another hosted service), or a plug-in to another product, to name a few. In addition, the methods 900, 1000, and 1100 are described, by way of example, with respect to FIGS. 1A-1C. However, these methods 900, 1000, and 1100 may additionally or alternatively be executed by any one system, or any combination of systems, including, but not limited to, those described herein.

FIG. 9 is a flow diagram showing a method 900 for detecting occluded objects within images using one or more image processing techniques, in accordance with some embodiments of the present disclosure. The method 900, at block B902, may include determining, using one or more machine learning models and based at least on image data representative of an image, a classification corresponding to a portion of the image. For instance, the classification component 102 may process the image data 104 representative of the image using the machine learning model(s), where the machine learning model(s) is trained to generate various classifications and/or segmentation masks associated with the objects depicted by the image. For instance, based at least on the processing, the machine learning model(s) may determine at least the classification associated with the portion of the image. As described herein, the portion of the image may include a pixel, an area, a region, a tile, a block, and/or any other portion associated with the image.

The method 900, at block B904, may include determining, based at least on map data associated with an environment, that a point within the environment that corresponds to the portion of the image is associated with a traffic object. For instance, the projection component 108 may process at least the map data 110 representing the environment that is at least partially depicted by the image. Based at least on the processing, the projection component 108 may project the 3D location associated with the point within the environment to the 2D location associated with the portion of the image. Additionally, the projection component 108 may then use the label associated with the point from the map to generate a label associated with the portion of the image, where the label includes traffic object. As described herein, the traffic object may include, but is not limited to, a road, a sidewalk, a road marking, a traffic pole, a traffic sign, a traffic signal, and/or any other type of object associated with navigating machines within the environment.

The method 900, at block B906, may include determining, based at least on the classification, whether the traffic object is occluded at the portion of the image. For instance, the occlusion component 114 may use the classification data 106 representing the classification associated with the portion of the image and the projected label data 112 representing the generated label for the portion of the image to determine whether the traffic object is occluded at the portion of the image. As described herein, in some examples, the occlusion component 114 may determine that the traffic object is not occluded at the portion of the image based at least on the classification corresponding to (e.g., being similar to) the label of the traffic object or determine that the traffic object is occluded at the portion of the image based at least on the classification not corresponding to (e.g., being different than) the label. For example, if the traffic object includes a road boundary or road line, then the occlusion component 114 may determine that the traffic object is not occluded at the portion of the image when the classification includes road or sidewalk, or determine that the traffic object is occluded at the portion of the image when the classification includes car, vegetation, or pedestrian.

The method 900, at block B908, may include generating data indicating whether the traffic object is occluded at the portion of the image. For instance, the occlusion component 114 may generate the occlusion data 116 indicating whether the traffic object is occluded at the portion of the image. As described herein, the occlusion data 116 may represent one of a first label indicating that the traffic object is not occluded, a second label indicating that the traffic object is occluded, a third label indicating that the traffic object is occluded by a dynamic object, a fourth label indicating that traffic object is occluded by a static object, and/or any other label.

FIG. 10 is a flow diagram showing a method 1000 for detecting occluded objects within images using one or more point cloud techniques, in accordance with some embodiments of the present disclosure. The method 1000, at block B1002, may include determining, based at least on map data associated with an environment, a first distance associated with a point within the environment that corresponds to a portion of an image. For instance, the positional component 120 may use the map data 110 to project a 3D location associated with the point within the environment to a 2D location associated with the portion (e.g., a pixel) of the image. The positional component 120 may then use the 2D location and the 3D location to determine the first distance associated with the point. As described herein, the point may be associated with a traffic object located within the environment.

The method 1000, at block B1004, may include determining, based at least on point cloud data, a second distance associated with the point within the environment. For instance, the distance component 136 may use the occupancy data 134 representing the point cloud to determine the second distance associated with the point within the environment. As described herein, in some examples, to determine the second distance, the distance component 136 may project multiple rays from the 2D location associated with the portion of the image using the point cloud. The distance component 136 may then use the distances associated with the multiple rays to determine the second distance.

The method 1000, at block B1006, may include determining, based at least on the first distance and the second distance, whether the traffic object is occluded at the portion of the image. For instance, the occlusion component 140 may determine, based at least on the first distance and the second distance, whether the traffic object is occluded at the portion of the image. As described herein, in some examples, the occlusion component 140 may determine that the traffic object is occluded at the portion of the image based at least on the second distance being outside of a threshold distance to the first distance or determine that the traffic object is not occluded at the portion of the image based at least on the second distance being within the threshold distance to the first distance. Additionally, in such examples, the occlusion component 140 may use a set threshold distance and/or may dynamically determine the threshold distance.

The method 1000, at block B1008, may include generating data indicating whether the traffic object is occluded at the portion of the image. For instance, the occlusion component 140 may generate the occlusion data 144 indicating whether the traffic object is occluded at the portion of the image. As described herein, the occlusion data 144 may represent one of a first label indicating that the traffic object is not occluded, a second label indicating that the object is occluded, a third label indicating that the traffic object is occluded by a dynamic object, a fourth label indicating that traffic object is occluded by a static object, and/or any other label.

FIG. 11 is a flow diagram showing a method 1100 for detecting occluded objects within images using one or more image processing techniques and one or more point cloud techniques, in accordance with some embodiments of the present disclosure. For instance, the process 1100, at block B1102, may include receiving first data indicating whether a traffic object is occluded at a portion of an image, the first data generated using image processing. For instance, the arbitration component 148 may receive the occlusion data 116 indicating whether the traffic object is occluded at the portion of the image, where the occlusion data 116 is generated using the process 100 of FIG. 1A.

The method 1100, at block B1104, may include receiving second data indicating whether the traffic object is occluded at the portion of the image, the second data generated using point cloud data. For instance, the arbitration component 148 may receive the occlusion data 144 also indicating whether the traffic object is occluded at the portion of the image, where the occlusion data 144 is generated using the process 118 of FIG. 1B.

The method 1100, at block B1106, may include determining, based at least on the first data and the second data, whether the traffic object is occluded at the portion of the image. For instance, the arbitration component 148 may determine, based at least on the occlusion data 116 and the occlusion data 144, whether the traffic object is occluded at the portion of the image. In some examples, the arbitration component 148 may make the determination using additional data, such as the uncertainty data 150 and/or the location data 152. Additionally, the arbitration component 148 may use one or more techniques to make the determination, which are described in more detail herein.

The method 1100, at block B1108, may include generating third data indicating whether the traffic object is occluded at the portion of the image. For instance, the arbitration component 148 may generate the occlusion data 154 indicating whether the traffic object is occluded at the portion of the image. As described herein, the occlusion data 154 may represent one of a first label indicating that the traffic object is not occluded, a second label indicating that the traffic object is occluded, a third label indicating that the traffic object is occluded by a dynamic object, a fourth label indicating that traffic object is occluded by a static object, and/or any other label.

Example Autonomous Vehicle

Figure 12A:
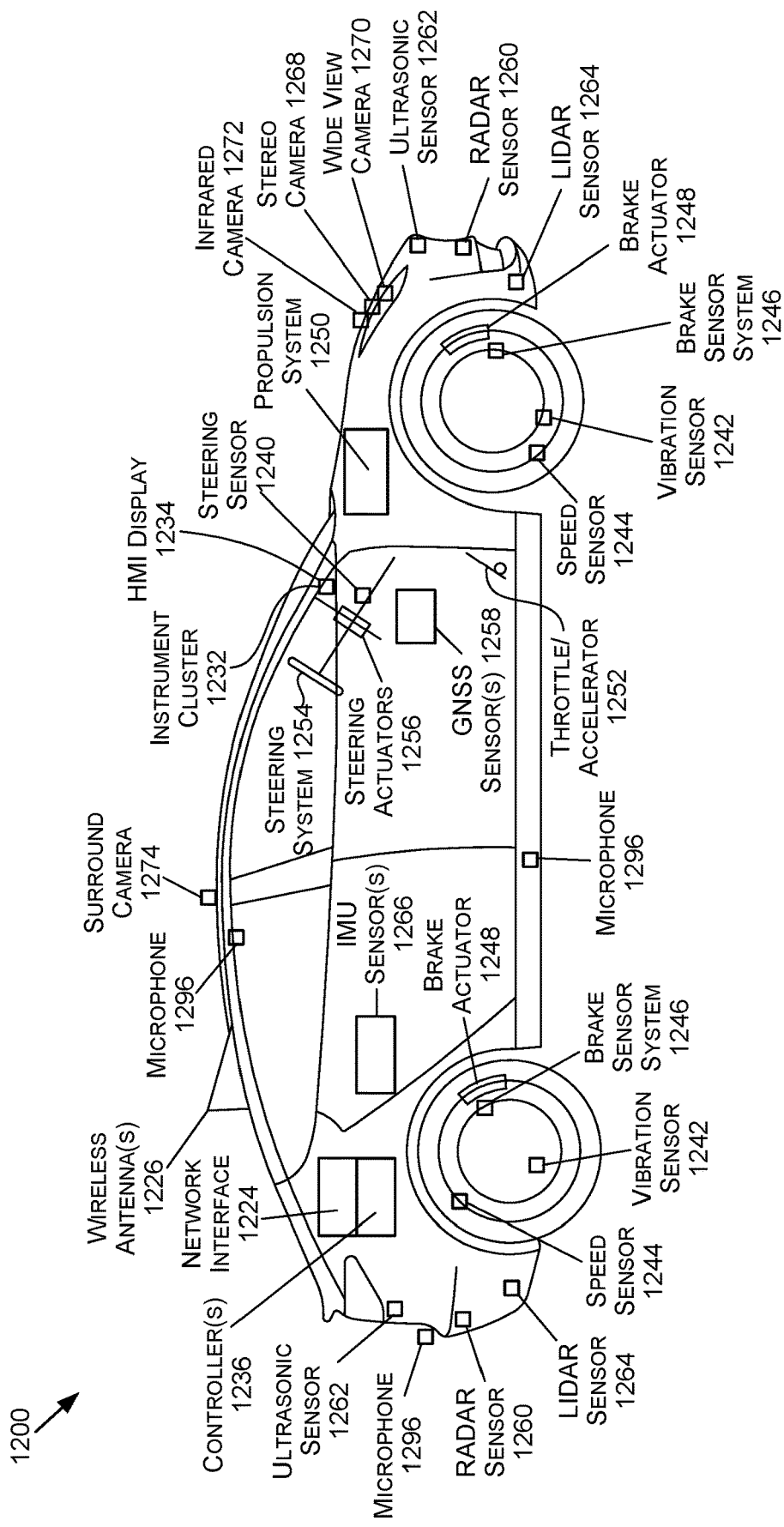
FIG. 12A is an illustration of an example autonomous vehicle, in accordance with some embodiments of the present disclosure.

FIG. 12A is an illustration of an example autonomous vehicle 1200, in accordance with some embodiments of the present disclosure. The autonomous vehicle 1200 (alternatively referred to herein as the "vehicle 1200") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1200 may be capable of functionality in accordance with one or more of Level 3-Level 5 of the autonomous driving levels. The vehicle 1200 may be capable of functionality in accordance with one or more of Level 1-Level 5 of the autonomous driving levels. For example, the vehicle 1200 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1200 or other machine, such as being fully autonomous, being highly autonomous, being conditionally autonomous, being partially autonomous, providing assistive autonomy, being semi-autonomous, being primarily autonomous, or other designation.

The vehicle 1200 may include components such as a chassis, a vehicle body, wheels (e.g., 2, 4, 6, 8, 18, etc.), tires, axles, and other components of a vehicle. The vehicle 1200 may include a propulsion system 1250, such as an internal combustion engine, hybrid electric power plant, an all-electric engine, and/or another propulsion system type. The propulsion system 1250 may be connected to a drive train of the vehicle 1200, which may include a transmission, to enable the propulsion of the vehicle 1200. The propulsion system 1250 may be controlled in response to receiving signals from the throttle/accelerator 1252.

A steering system 1254, which may include a steering wheel, may be used to steer the vehicle 1200 (e.g., along a desired path or route) when the propulsion system 1250 is operating (e.g., when the vehicle is in motion). The steering system 1254 may receive signals from a steering actuator 1256. The steering wheel may be optional for full automation (Level 5) functionality.

The brake sensor system 1246 may be used to operate the vehicle brakes in response to receiving signals from the brake actuators 1248 and/or brake sensors.

Controller(s) 1236, which may include one or more system on chips (SoCs) 1204 (FIG. 12C) and/or GPU(s), may provide signals (e.g., representative of commands) to one or more components and/or systems of the vehicle 1200. For example, the controller(s) may send signals to operate the vehicle brakes via one or more brake actuators 1248, to operate the steering system 1254 via one or more steering actuators 1256, to operate the propulsion system 1250 via one or more throttle/accelerators 1252. The controller(s) 1236 may include one or more onboard (e.g., integrated) computing devices (e.g., supercomputers) that process sensor signals, and output operation commands (e.g., signals representing commands) to enable autonomous driving and/or to assist a human driver in driving the vehicle 1200. The controller(s) 1236 may include a first controller 1236 for autonomous driving functions, a second controller 1236 for functional safety functions, a third controller 1236 for artificial intelligence functionality (e.g., computer vision), a fourth controller 1236 for infotainment functionality, a fifth controller 1236 for redundancy in emergency conditions, and/or other controllers. In some examples, a single controller 1236 may handle two or more of the above functionalities, two or more controllers 1236 may handle a single functionality, and/or any combination thereof.

The controller(s) 1236 may provide the signals for controlling one or more components and/or systems of the vehicle 1200 in response to sensor data received from one or more sensors (e.g., sensor inputs). The sensor data may be received from, for example and without limitation, global navigation satellite systems ("GNSS") sensor(s) 1258 (e.g., Global Positioning System sensor(s)), RADAR sensor(s) 1260, ultrasonic sensor(s) 1262, LIDAR sensor(s) 1264, inertial measurement unit (IMU) sensor(s) 1266 (e.g., accelerometer(s), gyroscope(s), magnetic compass(es), magnetometer(s), etc.), microphone(s) 1296, stereo camera(s) 1268, wide-view camera(s) 1270 (e.g., fisheye cameras), infrared camera(s) 1272, surround camera(s) 1274 (e.g., 360 degree cameras), long-range and/or mid-range camera(s) 1298, speed sensor(s) 1244 (e.g., for measuring the speed of the vehicle 1200), vibration sensor(s) 1242, steering sensor(s) 1240, brake sensor(s) (e.g., as part of the brake sensor system 1246), and/or other sensor types.

One or more of the controller(s) 1236 may receive inputs (e.g., represented by input data) from an instrument cluster 1232 of the vehicle 1200 and provide outputs (e.g., represented by output data, display data, etc.) via a human-machine interface (HMI) display 1234, an audible annunciator, a loudspeaker, and/or via other components of the vehicle 1200. The outputs may include information such as vehicle velocity, speed, time, map data (e.g., the High Definition ("HD") map 1222 of FIG. 12C), location data (e.g., the vehicle's 1200 location, such as on a map), direction, location of other vehicles (e.g., an occupancy grid), information about objects and status of objects as perceived by the controller(s) 1236, etc. For example, the HMI display 1234 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1200 further includes a network interface 1224 which may use one or more wireless antenna(s) 1226 and/or modem(s) to communicate over one or more networks. For example, the network interface 1224 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1226 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 12B:
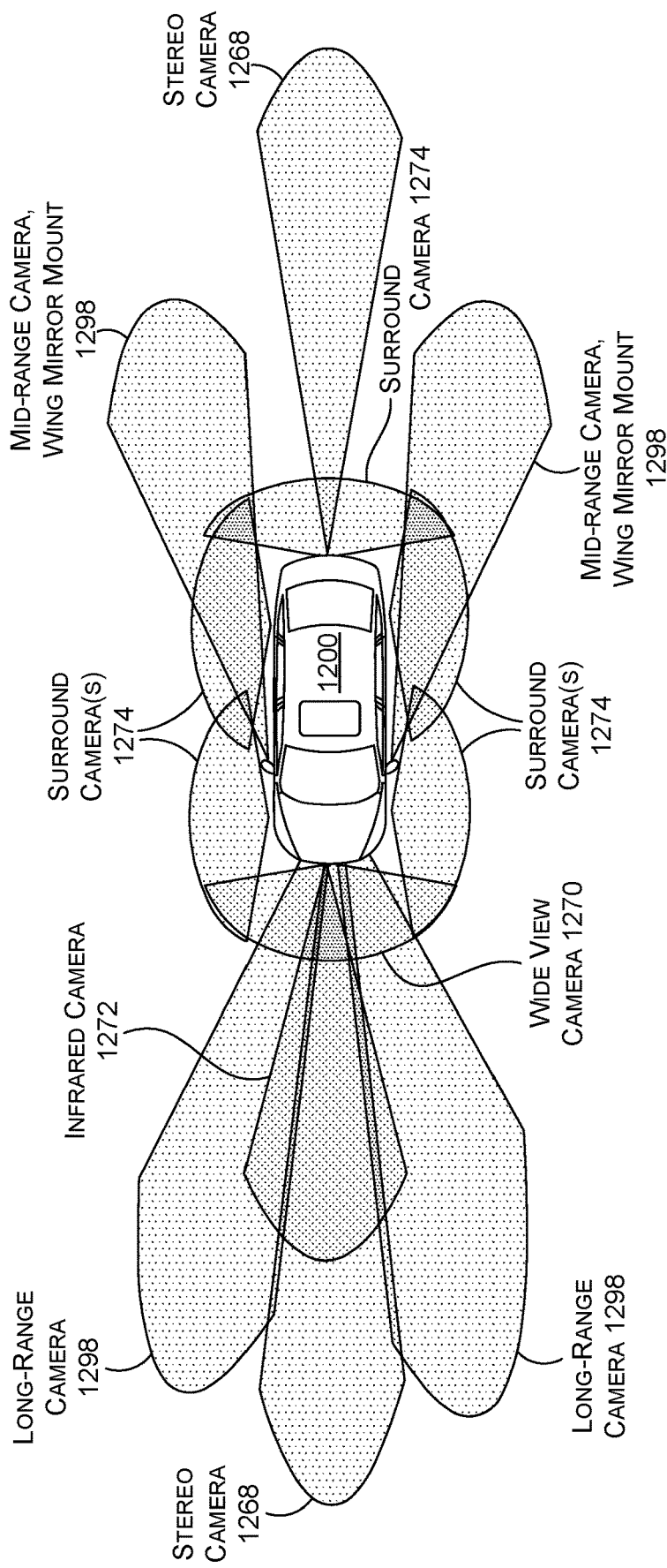
FIG. 12B is an example of camera locations and fields of view for the example autonomous vehicle of FIG. 12A, in accordance with some embodiments of the present disclosure.

FIG. 12B is an example of camera locations and fields of view for the example autonomous vehicle 1200 of FIG. 12A, in accordance with some embodiments of the present disclosure. The cameras and respective fields of view are one example embodiment and are not intended to be limiting. For example, additional and/or alternative cameras may be included and/or the cameras may be located at different locations on the vehicle 1200.

The camera types for the cameras may include, but are not limited to, digital cameras that may be adapted for use with the components and/or systems of the vehicle 1200. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1200 (e.g., front-facing cameras) may be used for surround view, to help identify forward facing paths and obstacles, as well aid in, with the help of one or more controllers 1236 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semi-conductor ("CMOS") color imager. Another example may be a wide-view camera(s) 1270 that may be used to perceive objects coming into view from the periphery (e.g., pedestrians, crossing traffic or bicycles). Although only one wide-view camera is illustrated in FIG. 12B, there may be any number (including zero) of wide-view cameras 1270 on the vehicle 1200. In addition, any number of long-range camera(s) 1298 (e.g., a long-view stereo camera pair) may be used for depth-based object detection, especially for objects for which a neural network has not yet been trained. The long-range camera(s) 1298 may also be used for object detection and classification, as well as basic object tracking.

Any number of stereo cameras 1268 may also be included in a front-facing configuration. In at least one embodiment, one or more of stereo camera(s) 1268 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1268 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1268 may be used in addition to, or alternatively from, those described herein.

Cameras with a field of view that include portions of the environment to the side of the vehicle 1200 (e.g., side-view cameras) may be used for surround view, providing information used to create and update the occupancy grid, as well as to generate side impact collision warnings. For example, surround camera(s) 1274 (e.g., four surround cameras 1274 as illustrated in FIG. 12B) may be positioned to on the vehicle 1200. The surround camera(s) 1274 may include wide-view camera(s) 1270, fisheye camera(s), 360 degree camera(s), and/or the like. Four example, four fisheye cameras may be positioned on the vehicle's front, rear, and sides. In an alternative arrangement, the vehicle may use three surround camera(s) 1274 (e.g., left, right, and rear), and may leverage one or more other camera(s) (e.g., a forward-facing camera) as a fourth surround view camera.

Cameras with a field of view that include portions of the environment to the rear of the vehicle 1200 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1298, stereo camera(s) 1268), infrared camera(s) 1272, etc.), as described herein.

Figure 12C:
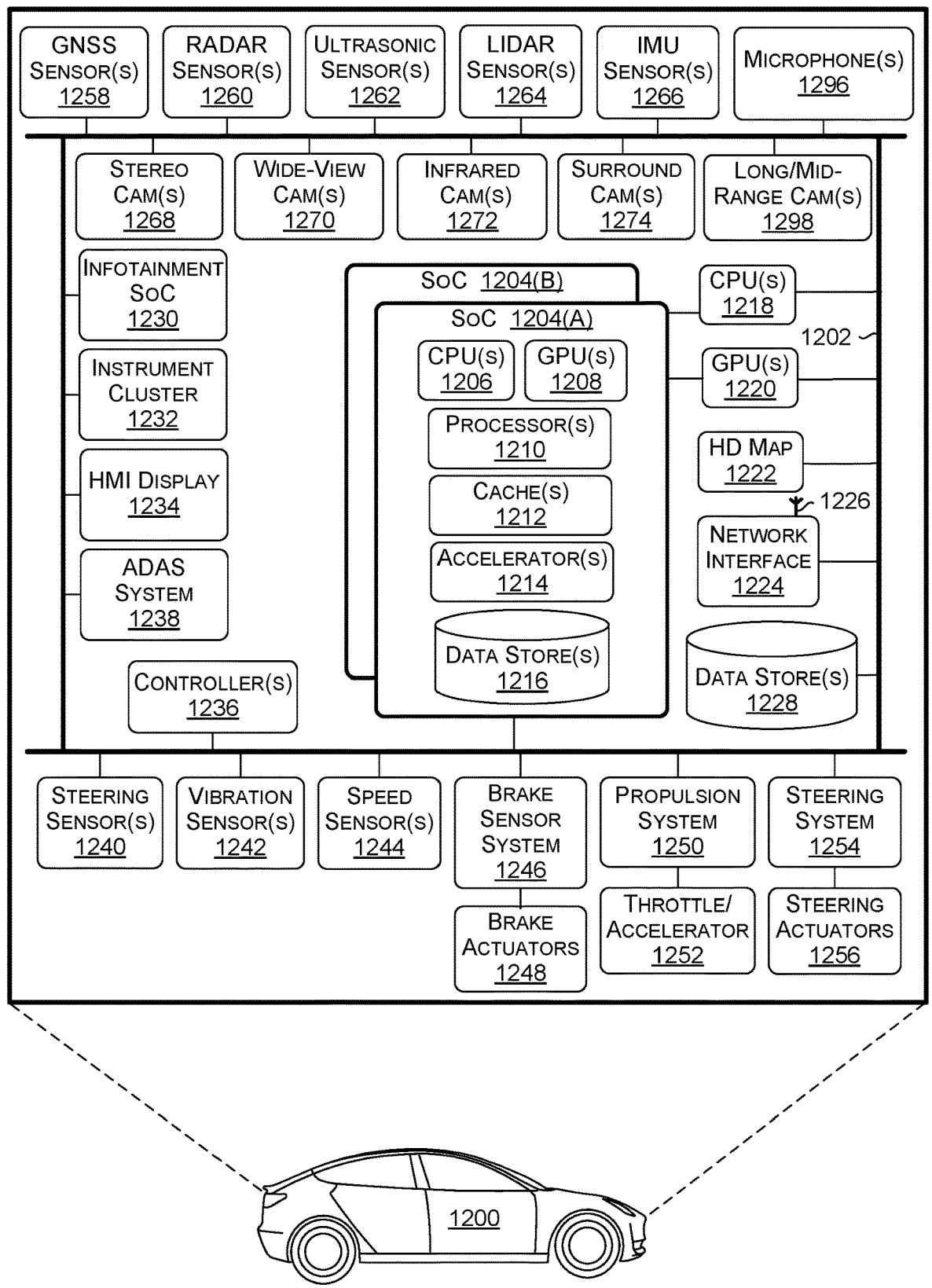
FIG. 12C is a block diagram of an example system architecture for the example autonomous vehicle of FIG. 12A, in accordance with some embodiments of the present disclosure.

FIG. 12C is a block diagram of an example system architecture for the example autonomous vehicle 1200 of FIG. 12A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1200 in FIG. 12C are illustrated as being connected via bus 1202. The bus 1202 may include a Controller Area Network (CAN) data interface (alternatively referred to herein as a "CAN bus"). A CAN may be a network inside the vehicle 1200 used to aid in control of various features and functionality of the vehicle 1200, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1202 is described herein as being a CAN bus, this is not intended to be limiting. For example, in addition to, or alternatively from, the CAN bus, FlexRay and/or Ethernet may be used. Additionally, although a single line is used to represent the bus 1202, this is not intended to be limiting. For example, there may be any number of busses 1202, which may include one or more CAN busses, one or more FlexRay busses, one or more Ethernet busses, and/or one or more other types of busses using a different protocol. In some examples, two or more busses 1202 may be used to perform different functions, and/or may be used for redundancy. For example, a first bus 1202 may be used for collision avoidance functionality and a second bus 1202 may be used for actuation control. In any example, each bus 1202 may communicate with any of the components of the vehicle 1200, and two or more busses 1202 may communicate with the same components. In some examples, each SoC 1204, each controller 1236, and/or each computer within the vehicle may have access to the same input data (e.g., inputs from sensors of the vehicle 1200), and may be connected to a common bus, such the CAN bus.

The vehicle 1200 may include one or more controller(s) 1236, such as those described herein with respect to FIG. 12A. The controller(s) 1236 may be used for a variety of functions. The controller(s) 1236 may be coupled to any of the various other components and systems of the vehicle 1200, and may be used for control of the vehicle 1200, artificial intelligence of the vehicle 1200, infotainment for the vehicle 1200, and/or the like.

The vehicle 1200 may include a system(s) on a chip (SoC) 1204. The SoC 1204 may include CPU(s) 1206, GPU(s) 1208, processor(s) 1210, cache(s) 1212, accelerator(s) 1214, data store(s) 1216, and/or other components and features not illustrated. The SoC(s) 1204 may be used to control the vehicle 1200 in a variety of platforms and systems. For example, the SoC(s) 1204 may be combined in a system (e.g., the system of the vehicle 1200) with an HD map 1222 which may obtain map refreshes and/or updates via a network interface 1224 from one or more servers (e.g., server(s) 1278 of FIG. 12D).

The CPU(s) 1206 may include a CPU cluster or CPU complex (alternatively referred to herein as a "CCPLEX"). The CPU(s) 1206 may include multiple cores and/or L2 caches. For example, in some embodiments, the CPU(s) 1206 may include eight cores in a coherent multi-processor configuration. In some embodiments, the CPU(s) 1206 may include four dual-core clusters where each cluster has a dedicated L2 cache (e.g., a 2 MB L2 cache). The CPU(s) 1206 (e.g., the CCPLEX) may be configured to support simultaneous cluster operation enabling any combination of the clusters of the CPU(s) 1206 to be active at any given time.

The CPU(s) 1206 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1206 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1208 may include an integrated GPU (alternatively referred to herein as an "iGPU"). The GPU(s) 1208 may be programmable and may be efficient for parallel workloads. The GPU(s) 1208, in some examples, may use an enhanced tensor instruction set. The GPU(s) 1208 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1208 may include at least eight streaming microprocessors. The GPU(s) 1208 may use compute application programming interface(s) (API(s)). In addition, the GPU(s) 1208 may use one or more parallel computing platforms and/or programming models (e.g., NVIDIA's CUDA).

The GPU(s) 1208 may be power-optimized for best performance in automotive and embedded use cases. For example, the GPU(s) 1208 may be fabricated on a Fin field-effect transistor (FinFET). However, this is not intended to be limiting and the GPU(s) 1208 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1208 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1208 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1208 to access the CPU(s) 1206 page tables directly. In such examples, when the GPU(s) 1208 memory management unit (MMU) experiences a miss, an address translation request may be transmitted to the CPU(s) 1206. In response, the CPU(s) 1206 may look in its page tables for the virtual-to-physical mapping for the address and transmits the translation back to the GPU(s) 1208. As such, unified memory technology may allow a single unified virtual address space for memory of both the CPU(s) 1206 and the GPU(s) 1208, thereby simplifying the GPU(s) 1208 programming and porting of applications to the GPU(s) 1208.

In addition, the GPU(s) 1208 may include an access counter that may keep track of the frequency of access of the GPU(s) 1208 to memory of other processors. The access counter may help ensure that memory pages are moved to the physical memory of the processor that is accessing the pages most frequently.

The SoC(s) 1204 may include any number of cache(s) 1212, including those described herein. For example, the cache(s) 1212 may include an L3 cache that is available to both the CPU(s) 1206 and the GPU(s) 1208 (e.g., that is connected both the CPU(s) 1206 and the GPU(s) 1208). The cache(s) 1212 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1204 may include an arithmetic logic unit(s) (ALU(s)) which may be leveraged in performing processing with respect to any of the variety of tasks or operations of the vehicle 1200—such as processing DNNs. In addition, the SoC(s) 1204 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1206 and/or GPU(s) 1208.

The SoC(s) 1204 may include one or more accelerators 1214 (e.g., hardware accelerators, software accelerators, or a combination thereof). For example, the SoC(s) 1204 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1208 and to off-load some of the tasks of the GPU(s) 1208 (e.g., to free up more cycles of the GPU(s) 1208 for performing other tasks). As an example, the accelerator(s) 1214 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1214 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1208, and by using an inference accelerator, for example, a designer may target either the DLA(s) or the GPU(s) 1208 for any function. For example, the designer may focus processing of CNNs and floating point operations on the DLA(s) and leave other functions to the GPU(s) 1208 and/or other accelerator(s) 1214.

The accelerator(s) 1214 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1206. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1214 (e.g., the hardware acceleration cluster) may include a computer vision network on-chip and SRAM, for providing a high-bandwidth, low latency SRAM for the accelerator(s) 1214. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1204 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1214 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1266 output that correlates with the vehicle 1200 orientation, distance, 3D location estimates of the object obtained from the neural network and/or other sensors (e.g., LIDAR sensor(s) 1264 or RADAR sensor(s) 1260), among others.

The SoC(s) 1204 may include data store(s) 1216 (e.g., memory). The data store(s) 1216 may be on-chip memory of the SoC(s) 1204, which may store neural networks to be executed on the GPU and/or the DLA. In some examples, the data store(s) 1216 may be large enough in capacity to store multiple instances of neural networks for redundancy and safety. The data store(s) 1212 may comprise L2 or L3 cache(s) 1212. Reference to the data store(s) 1216 may include reference to the memory associated with the PVA, DLA, and/or other accelerator(s) 1214, as described herein.

The SoC(s) 1204 may include one or more processor(s) 1210 (e.g., embedded processors). The processor(s) 1210 may include a boot and power management processor that may be a dedicated processor and subsystem to handle boot power and management functions and related security enforcement. The boot and power management processor may be a part of the SoC(s) 1204 boot sequence and may provide runtime power management services. The boot power and management processor may provide clock and voltage programming, assistance in system low power state transitions, management of SoC(s) 1204 thermals and temperature sensors, and/or management of the SoC(s) 1204 power states. Each temperature sensor may be implemented as a ring-oscillator whose output frequency is proportional to temperature, and the SoC(s) 1204 may use the ring-oscillators to detect temperatures of the CPU(s) 1206, GPU(s) 1208, and/or accelerator(s) 1214. If temperatures are determined to exceed a threshold, the boot and power management processor may enter a temperature fault routine and put the SoC(s) 1204 into a lower power state and/or put the vehicle 1200 into a chauffeur to safe stop mode (e.g., bring the vehicle 1200 to a safe stop).

The processor(s) 1210 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1210 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1210 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1210 may further include a real-time camera engine that may include a dedicated processor subsystem for handling real-time camera management.

The processor(s) 1210 may further include a high-dynamic range signal processor that may include an image signal processor that is a hardware engine that is part of the camera processing pipeline.

The processor(s) 1210 may include a video image compositor that may be a processing block (e.g., implemented on a microprocessor) that implements video post-processing functions needed by a video playback application to produce the final image for the player window. The video image compositor may perform lens distortion correction on wide-view camera(s) 1270, surround camera(s) 1274, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1208 is not required to continuously render new surfaces. Even when the GPU(s) 1208 is powered on and active doing 3D rendering, the video image compositor may be used to offload the GPU(s) 1208 to improve performance and responsiveness.

The SoC(s) 1204 may further include a mobile industry processor interface (MIPI) camera serial interface for receiving video and input from cameras, a high-speed interface, and/or a video input block that may be used for camera and related pixel input functions. The SoC(s) 1204 may further include an input/output controller(s) that may be controlled by software and may be used for receiving I/O signals that are uncommitted to a specific role.

The SoC(s) 1204 may further include a broad range of peripheral interfaces to enable communication with peripherals, audio codecs, power management, and/or other devices. The SoC(s) 1204 may be used to process data from cameras (e.g., connected over Gigabit Multimedia Serial Link and Ethernet), sensors (e.g., LIDAR sensor(s) 1264, RADAR sensor(s) 1260, etc. that may be connected over Ethernet), data from bus 1202 (e.g., speed of vehicle 1200, steering wheel position, etc.), data from GNSS sensor(s) 1258 (e.g., connected over Ethernet or CAN bus). The SoC(s) 1204 may further include dedicated high-performance mass storage controllers that may include their own DMA engines, and that may be used to free the CPU(s) 1206 from routine data management tasks.

The SoC(s) 1204 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1204 may be faster, more reliable, and even more energy-efficient and space-efficient than conventional systems. For example, the accelerator(s) 1214, when combined with the CPU(s) 1206, the GPU(s) 1208, and the data store(s) 1216, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1220) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1208.

In some examples, a CNN for facial recognition and vehicle owner identification may use data from camera sensors to identify the presence of an authorized driver and/or owner of the vehicle 1200. The always on sensor processing engine may be used to unlock the vehicle when the owner approaches the driver door and turn on the lights, and, in security mode, to disable the vehicle when the owner leaves the vehicle. In this way, the SoC(s) 1204 provide for security against theft and/or carjacking.

In another example, a CNN for emergency vehicle detection and identification may use data from microphones 1296 to detect and identify emergency vehicle sirens. In contrast to conventional systems, that use general classifiers to detect sirens and manually extract features, the SoC(s) 1204 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1258. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1262, until the emergency vehicle(s) passes.

The vehicle may include a CPU(s) 1218 (e.g., discrete CPU(s), or dCPU(s)), that may be coupled to the SoC(s) 1204 via a high-speed interconnect (e.g., PCIe). The CPU(s) 1218 may include an X86 processor, for example. The CPU(s) 1218 may be used to perform any of a variety of functions, including arbitrating potentially inconsistent results between ADAS sensors and the SoC(s) 1204, and/or monitoring the status and health of the controller(s) 1236 and/or infotainment SoC 1230, for example.

The vehicle 1200 may include a GPU(s) 1220 (e.g., discrete GPU(s), or dGPU(s)), that may be coupled to the SoC(s) 1204 via a high-speed interconnect (e.g., NVIDIA's NVLINK). The GPU(s) 1220 may provide additional artificial intelligence functionality, such as by executing redundant and/or different neural networks, and may be used to train and/or update neural networks based on input (e.g., sensor data) from sensors of the vehicle 1200.

The vehicle 1200 may further include the network interface 1224 which may include one or more wireless antennas 1226 (e.g., one or more wireless antennas for different communication protocols, such as a cellular antenna, a Bluetooth antenna, etc.). The network interface 1224 may be used to enable wireless connectivity over the Internet with the cloud (e.g., with the server(s) 1278 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1200 information about vehicles in proximity to the vehicle 1200 (e.g., vehicles in front of, on the side of, and/or behind the vehicle 1200). This functionality may be part of a cooperative adaptive cruise control functionality of the vehicle 1200.

The network interface 1224 may include a SoC that provides modulation and demodulation functionality and enables the controller(s) 1236 to communicate over wireless networks. The network interface 1224 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1200 may further include data store(s) 1228 which may include off-chip (e.g., off the SoC(s) 1204) storage. The data store(s) 1228 may include one or more storage elements including RAM, SRAM, DRAM, VRAM, Flash, hard disks, and/or other components and/or devices that may store at least one bit of data.

The vehicle 1200 may further include GNSS sensor(s) 1258. The GNSS sensor(s) 1258 (e.g., GPS, assisted GPS sensors, differential GPS (DGPS) sensors, etc.), to assist in mapping, perception, occupancy grid generation, and/or path planning functions. Any number of GNSS sensor(s) 1258 may be used, including, for example and without limitation, a GPS using a USB connector with an Ethernet to Serial (RS-232) bridge.

The vehicle 1200 may further include RADAR sensor(s) 1260. The RADAR sensor(s) 1260 may be used by the vehicle 1200 for long-range vehicle detection, even in darkness and/or severe weather conditions. RADAR functional safety levels may be ASIL B. The RADAR sensor(s) 1260 may use the CAN and/or the bus 1202 (e.g., to transmit data generated by the RADAR sensor(s) 1260) for control and to access object tracking data, with access to Ethernet to access raw data in some examples. A wide variety of RADAR sensor types may be used. For example, and without limitation, the RADAR sensor(s) 1260 may be suitable for front, rear, and side RADAR use. In some example, Pulse Doppler RADAR sensor(s) are used.

The RADAR sensor(s) 1260 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1260 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1200 surroundings at higher speeds with minimal interference from traffic in adjacent lanes. The other two antennae may expand the field of view, making it possible to quickly detect vehicles entering or leaving the vehicle's 1200 lane.

Mid-range RADAR systems may include, as an example, a range of up to 1260 m (front) or 80 m (rear), and a field of view of up to 42 degrees (front) or 1250 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1200 may further include ultrasonic sensor(s) 1262. The ultrasonic sensor(s) 1262, which may be positioned at the front, back, and/or the sides of the vehicle 1200, may be used for park assist and/or to create and update an occupancy grid. A wide variety of ultrasonic sensor(s) 1262 may be used, and different ultrasonic sensor(s) 1262 may be used for different ranges of detection (e.g., 2.5 m, 4 m). The ultrasonic sensor(s) 1262 may operate at functional safety levels of ASIL B.

The vehicle 1200 may include LIDAR sensor(s) 1264. The LIDAR sensor(s) 1264 may be used for object and pedestrian detection, emergency braking, collision avoidance, and/or other functions. The LIDAR sensor(s) 1264 may be functional safety level ASIL B. In some examples, the vehicle 1200 may include multiple LIDAR sensors 1264 (e.g., two, four, six, etc.) that may use Ethernet (e.g., to provide data to a Gigabit Ethernet switch).

In some examples, the LIDAR sensor(s) 1264 may be capable of providing a list of objects and their distances for a 360-degree field of view. Commercially available LIDAR sensor(s) 1264 may have an advertised range of approximately 1200 m, with an accuracy of 2 cm-3 cm, and with support for a 1200 Mbps Ethernet connection, for example. In some examples, one or more non-protruding LIDAR sensors 1264 may be used. In such examples, the LIDAR sensor(s) 1264 may be implemented as a small device that may be embedded into the front, rear, sides, and/or corners of the vehicle 1200. The LIDAR sensor(s) 1264, in such examples, may provide up to a 120-degree horizontal and 35-degree vertical field-of-view, with a 200 m range even for low-reflectivity objects. Front-mounted LIDAR sensor(s) 1264 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1200. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1264 may be less susceptible to motion blur, vibration, and/or shock.

The vehicle may further include IMU sensor(s) 1266. The IMU sensor(s) 1266 may be located at a center of the rear axle of the vehicle 1200, in some examples. The IMU sensor(s) 1266 may include, for example and without limitation, an accelerometer(s), a magnetometer(s), a gyroscope(s), a magnetic compass(es), and/or other sensor types. In some examples, such as in six-axis applications, the IMU sensor(s) 1266 may include accelerometers and gyroscopes, while in nine-axis applications, the IMU sensor(s) 1266 may include accelerometers, gyroscopes, and magnetometers.

In some embodiments, the IMU sensor(s) 1266 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1266 may enable the vehicle 1200 to estimate heading without requiring input from a magnetic sensor by directly observing and correlating the changes in velocity from GPS to the IMU sensor(s) 1266. In some examples, the IMU sensor(s) 1266 and the GNSS sensor(s) 1258 may be combined in a single integrated unit.

The vehicle may include microphone(s) 1296 placed in and/or around the vehicle 1200. The microphone(s) 1296 may be used for emergency vehicle detection and identification, among other things.

The vehicle may further include any number of camera types, including stereo camera(s) 1268, wide-view camera(s) 1270, infrared camera(s) 1272, surround camera(s) 1274, long-range and/or mid-range camera(s) 1298, and/or other camera types. The cameras may be used to capture image data around an entire periphery of the vehicle 1200. The types of cameras used depends on the embodiments and requirements for the vehicle 1200, and any combination of camera types may be used to provide the necessary coverage around the vehicle 1200. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 12A and FIG. 12B.

The vehicle 1200 may further include vibration sensor(s) 1242. The vibration sensor(s) 1242 may measure vibrations of components of the vehicle, such as the axle(s). For example, changes in vibrations may indicate a change in road surfaces. In another example, when two or more vibration sensors 1242 are used, the differences between the vibrations may be used to determine friction or slippage of the road surface (e.g., when the difference in vibration is between a power-driven axle and a freely rotating axle).

The vehicle 1200 may include an ADAS system 1238. The ADAS system 1238 may include a SoC, in some examples. The ADAS system 1238 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1260, LIDAR sensor(s) 1264, and/or a camera(s). The ACC systems may include longitudinal ACC and/or lateral ACC. Longitudinal ACC monitors and controls the distance to the vehicle immediately ahead of the vehicle 1200 and automatically adjust the vehicle speed to maintain a safe distance from vehicles ahead. Lateral ACC performs distance keeping, and advises the vehicle 1200 to change lanes when necessary. Lateral ACC is related to other ADAS applications such as LCA and CWS.

CACC uses information from other vehicles that may be received via the network interface 1224 and/or the wireless antenna(s) 1226 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1200), while the I2V communication concept provides information about traffic further ahead. CACC systems may include either or both I2V and V2V information sources. Given the information of the vehicles ahead of the vehicle 1200, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1260, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1260, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1200 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1200 if the vehicle 1200 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1260, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1200 is backing up. Some RCTW systems include AEB to ensure that the vehicle brakes are applied to avoid a crash. RCTW systems may use one or more rear-facing RADAR sensor(s) 1260, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1200, the vehicle 1200 itself must, in the case of conflicting results, decide whether to heed the result from a primary computer or a secondary computer (e.g., a first controller 1236 or a second controller 1236). For example, in some embodiments, the ADAS system 1238 may be a backup and/or secondary computer for providing perception information to a backup computer rationality module. The backup computer rationality monitor may run a redundant diverse software on hardware components to detect faults in perception and dynamic driving tasks. Outputs from the ADAS system 1238 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1204.

In other examples, ADAS system 1238 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1238 may be fed into the primary computer's perception block and/or the primary computer's dynamic driving task block. For example, if the ADAS system 1238 indicates a forward crash warning due to an object immediately ahead, the perception block may use this information when identifying objects. In other examples, the secondary computer may have its own neural network which is trained and thus reduces the risk of false positives, as described herein.

The vehicle 1200 may further include the infotainment SoC 1230 (e.g., an in-vehicle infotainment system (IVI)). Although illustrated and described as a SoC, the infotainment system may not be a SoC, and may include two or more discrete components. The infotainment SoC 1230 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1200. For example, the infotainment SoC 1230 may radios, disk players, navigation systems, video players, USB and Bluetooth connectivity, carputers, in-car entertainment, Wi-Fi, steering wheel audio controls, hands free voice control, a heads-up display (HUD), an HMI display 1234, a telematics device, a control panel (e.g., for controlling and/or interacting with various components, features, and/or systems), and/or other components. The infotainment SoC 1230 may further be used to provide information (e.g., visual and/or audible) to a user(s) of the vehicle, such as information from the ADAS system 1238, autonomous driving information such as planned vehicle maneuvers, trajectories, surrounding environment information (e.g., intersection information, vehicle information, road information, etc.), and/or other information.

The infotainment SoC 1230 may include GPU functionality. The infotainment SoC 1230 may communicate over the bus 1202 (e.g., CAN bus, Ethernet, etc.) with other devices, systems, and/or components of the vehicle 1200. In some examples, the infotainment SoC 1230 may be coupled to a supervisory MCU such that the GPU of the infotainment system may perform some self-driving functions in the event that the primary controller(s) 1236 (e.g., the primary and/or backup computers of the vehicle 1200) fail. In such an example, the infotainment SoC 1230 may put the vehicle 1200 into a chauffeur to safe stop mode, as described herein.

The vehicle 1200 may further include an instrument cluster 1232 (e.g., a digital dash, an electronic instrument cluster, a digital instrument panel, etc.). The instrument cluster 1232 may include a controller and/or supercomputer (e.g., a discrete controller or supercomputer). The instrument cluster 1232 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1230 and the instrument cluster 1232. In other words, the instrument cluster 1232 may be included as part of the infotainment SoC 1230, or vice versa.

Figure 12D:
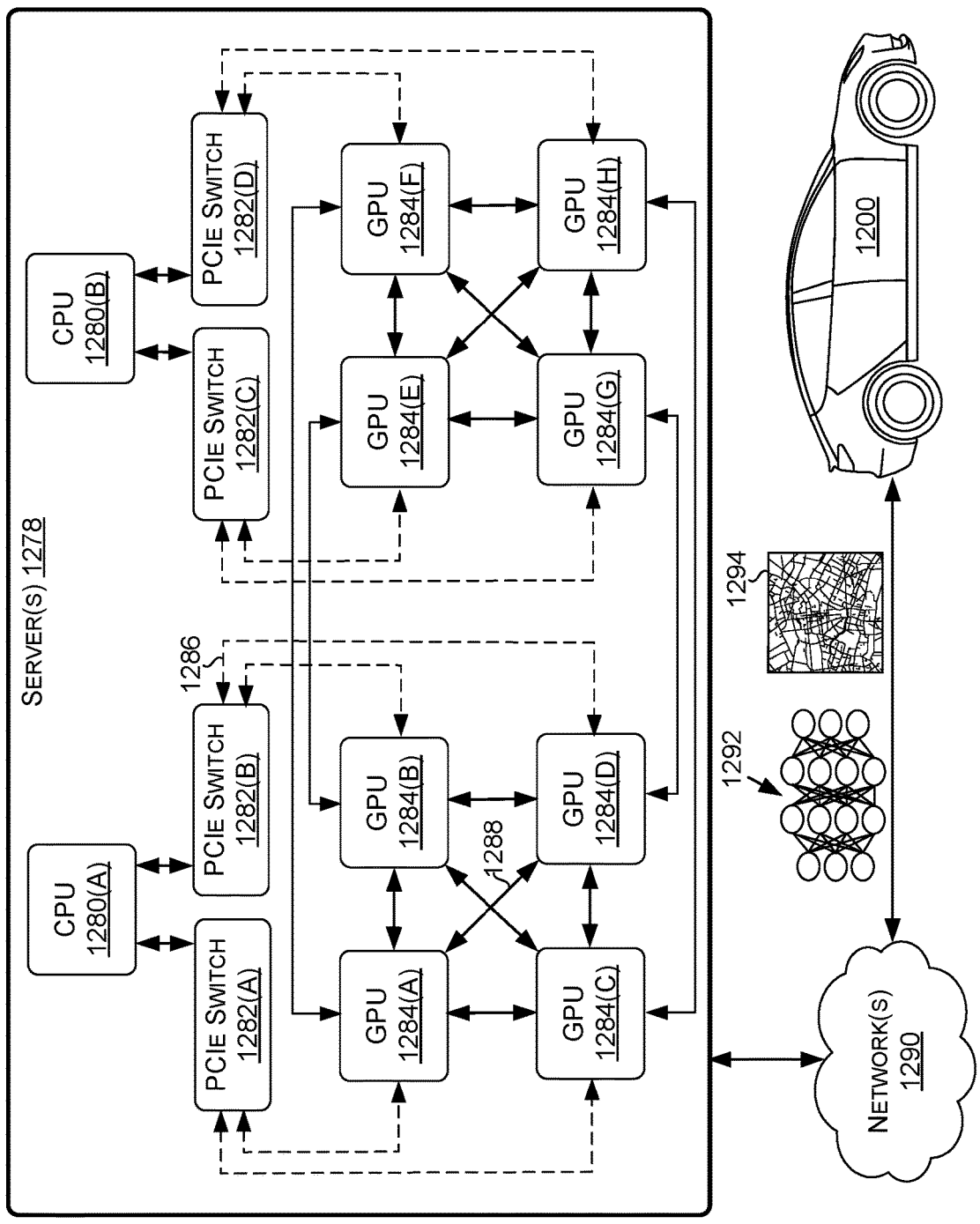
FIG. 12D is a system diagram for communication between cloud-based server(s) and the example autonomous vehicle of FIG. 12A, in accordance with some embodiments of the present disclosure.

FIG. 12D is a system diagram for communication between cloud-based server(s) and the example autonomous vehicle 1200 of FIG. 12A, in accordance with some embodiments of the present disclosure. The system 1276 may include server(s) 1278, network(s) 1290, and vehicles, including the vehicle 1200. The server(s) 1278 may include a plurality of GPUs 1284(A)-1284(H) (collectively referred to herein as GPUs 1284), PCIe switches 1282(A)-1282(H) (collectively referred to herein as PCIe switches 1282), and/or CPUs 1280(A)-1280(B) (collectively referred to herein as CPUs 1280). The GPUs 1284, the CPUs 1280, and the PCIe switches may be interconnected with high-speed interconnects such as, for example and without limitation, NVLink interfaces 1288 developed by NVIDIA and/or PCIe connections 1286. In some examples, the GPUs 1284 are connected via NVLink and/or NVSwitch SoC and the GPUs 1284 and the PCIe switches 1282 are connected via PCIe interconnects. Although eight GPUs 1284, two CPUs 1280, and two PCIe switches are illustrated, this is not intended to be limiting. Depending on the embodiment, each of the server(s) 1278 may include any number of GPUs 1284, CPUs 1280, and/or PCIe switches. For example, the server(s) 1278 may each include eight, sixteen, thirty-two, and/or more GPUs 1284.

The server(s) 1278 may receive, over the network(s) 1290 and from the vehicles, image data representative of images showing unexpected or changed road conditions, such as recently commenced road-work. The server(s) 1278 may transmit, over the network(s) 1290 and to the vehicles, neural networks 1292, updated neural networks 1292, and/or map information 1294, including information regarding traffic and road conditions. The updates to the map information 1294 may include updates for the HD map 1222, such as information regarding construction sites, potholes, detours, flooding, and/or other obstructions. In some examples, the neural networks 1292, the updated neural networks 1292, and/or the map information 1294 may have resulted from new training and/or experiences represented in data received from any number of vehicles in the environment, and/or based on training performed at a datacenter (e.g., using the server(s) 1278 and/or other servers).

The server(s) 1278 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1290, and/or the machine learning models may be used by the server(s) 1278 to remotely monitor the vehicles.

In some examples, the server(s) 1278 may receive data from the vehicles and apply the data to up-to-date real-time neural networks for real-time intelligent inferencing. The server(s) 1278 may include deep-learning supercomputers and/or dedicated AI computers powered by GPU(s) 1284, such as a DGX and DGX Station machines developed by NVIDIA. However, in some examples, the server(s) 1278 may include deep learning infrastructure that use only CPU-powered datacenters.

The deep-learning infrastructure of the server(s) 1278 may be capable of fast, real-time inferencing, and may use that capability to evaluate and verify the health of the processors, software, and/or associated hardware in the vehicle 1200. For example, the deep-learning infrastructure may receive periodic updates from the vehicle 1200, such as a sequence of images and/or objects that the vehicle 1200 has located in that sequence of images (e.g., via computer vision and/or other machine learning object classification techniques). The deep-learning infrastructure may run its own neural network to identify the objects and compare them with the objects identified by the vehicle 1200 and, if the results do not match and the infrastructure concludes that the AI in the vehicle 1200 is malfunctioning, the server(s) 1278 may transmit a signal to the vehicle 1200 instructing a fail-safe computer of the vehicle 1200 to assume control, notify the passengers, and complete a safe parking maneuver.

For inferencing, the server(s) 1278 may include the GPU(s) 1284 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 13:
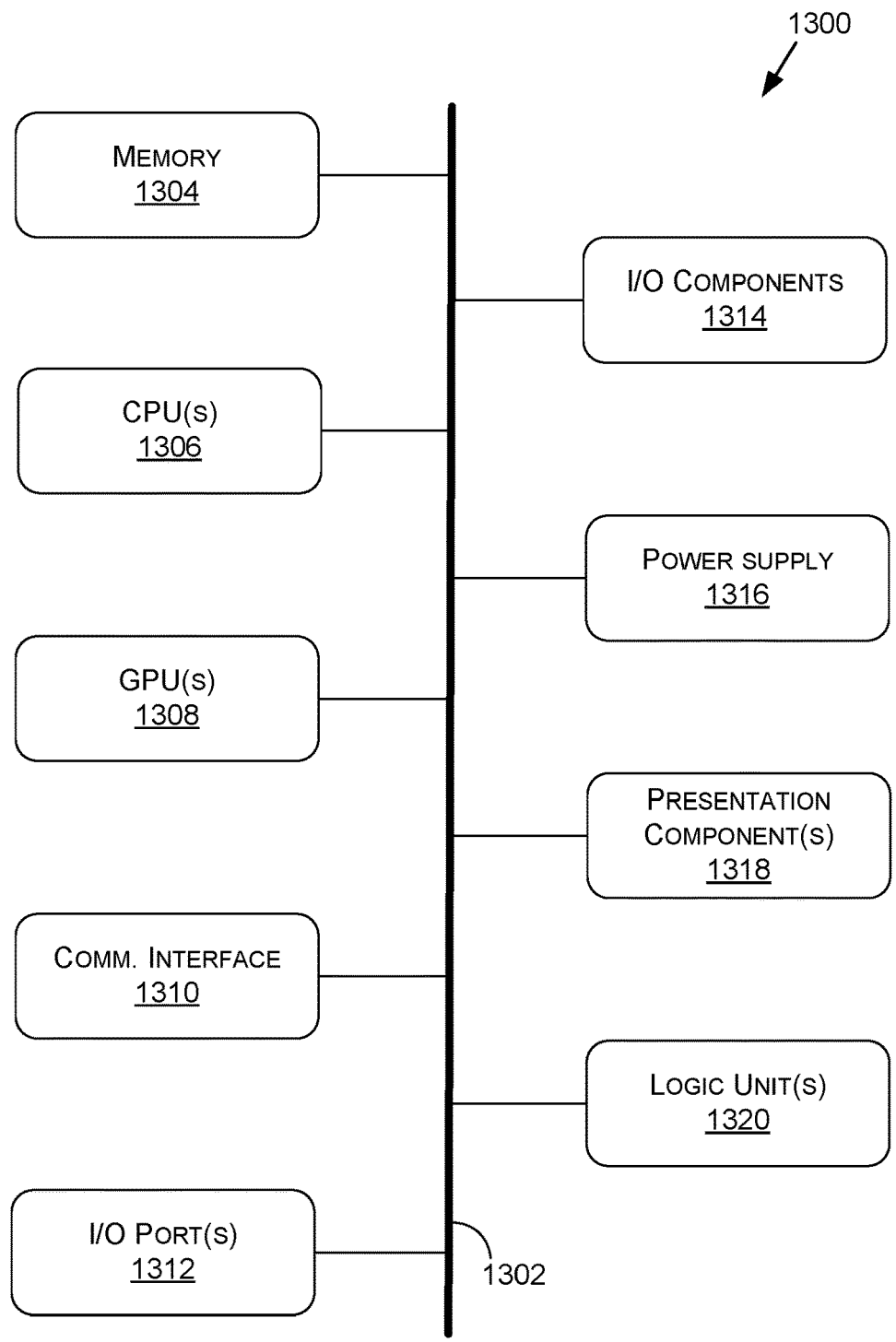
FIG. 13 is a block diagram of an example computing device suitable for use in implementing some embodiments of the present disclosure.

FIG. 13 is a block diagram of an example computing device(s) 1300 suitable for use in implementing some embodiments of the present disclosure. Computing device 1300 may include an interconnect system 1302 that directly or indirectly couples the following devices: memory 1304, one or more central processing units (CPUs) 1306, one or more graphics processing units (GPUs) 1308, a communication interface 1310, input/output (I/O) ports 1312, input/output components 1314, a power supply 1316, one or more presentation components 1318 (e.g., display(s)), and one or more logic units 1320. In at least one embodiment, the computing device(s) 1300 may comprise one or more virtual machines (VMs), and/or any of the components thereof may comprise virtual components (e.g., virtual hardware components). For non-limiting examples, one or more of the GPUs 1308 may comprise one or more vGPUs, one or more of the CPUs 1306 may comprise one or more vCPUs, and/or one or more of the logic units 1320 may comprise one or more virtual logic units. As such, a computing device(s) 1300 may include discrete components (e.g., a full GPU dedicated to the computing device 1300), virtual components (e.g., a portion of a GPU dedicated to the computing device 1300), or a combination thereof.

Although the various blocks of FIG. 13 are shown as connected via the interconnect system 1302 with lines, this is not intended to be limiting and is for clarity only. For example, in some embodiments, a presentation component 1318, such as a display device, may be considered an I/O component 1314 (e.g., if the display is a touch screen). As another example, the CPUs 1306 and/or GPUs 1308 may include memory (e.g., the memory 1304 may be representative of a storage device in addition to the memory of the GPUs 1308, the CPUs 1306, and/or other components). In other words, the computing device of FIG. 13 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 13.

The interconnect system 1302 may represent one or more links or busses, such as an address bus, a data bus, a control bus, or a combination thereof. The interconnect system 1302 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1306 may be directly connected to the memory 1304. Further, the CPU 1306 may be directly connected to the GPU 1308. Where there is direct, or point-to-point connection between components, the interconnect system 1302 may include a PCIe link to carry out the connection. In these examples, a PCI bus need not be included in the computing device 1300.

The memory 1304 may include any of a variety of computer-readable media. The computer-readable media may be any available media that may be accessed by the computing device 1300. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1304 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1300. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1306 may be configured to execute at least some of the computer-readable instructions to control one or more components of the computing device 1300 to perform one or more of the methods and/or processes described herein. The CPU(s) 1306 may each include one or more cores (e.g., one, two, four, eight, twenty-eight, seventy-two, etc.) that are capable of handling a multitude of software threads simultaneously. The CPU(s) 1306 may include any type of processor, and may include different types of processors depending on the type of computing device 1300 implemented (e.g., processors with fewer cores for mobile devices and processors with more cores for servers). For example, depending on the type of computing device 1300, the processor may be an Advanced RISC Machines (ARM) processor implemented using Reduced Instruction Set Computing (RISC) or an x86 processor implemented using Complex Instruction Set Computing (CISC). The computing device 1300 may include one or more CPUs 1306 in addition to one or more microprocessors or supplementary co-processors, such as math co-processors.

In addition to or alternatively from the CPU(s) 1306, the GPU(s) 1308 may be configured to execute at least some of the computer-readable instructions to control one or more components of the computing device 1300 to perform one or more of the methods and/or processes described herein. One or more of the GPU(s) 1308 may be an integrated GPU (e.g., with one or more of the CPU(s) 1306 and/or one or more of the GPU(s) 1308 may be a discrete GPU. In embodiments, one or more of the GPU(s) 1308 may be a coprocessor of one or more of the CPU(s) 1306. The GPU(s) 1308 may be used by the computing device 1300 to render graphics (e.g., 3D graphics) or perform general purpose computations. For example, the GPU(s) 1308 may be used for General-Purpose computing on GPUs (GPGPU). The GPU(s) 1308 may include hundreds or thousands of cores that are capable of handling hundreds or thousands of software threads simultaneously. The GPU(s) 1308 may generate pixel data for output images in response to rendering commands (e.g., rendering commands from the CPU(s) 1306 received via a host interface). The GPU(s) 1308 may include graphics memory, such as display memory, for storing pixel data or any other suitable data, such as GPGPU data. The display memory may be included as part of the memory 1304. The GPU(s) 1308 may include two or more GPUs operating in parallel (e.g., via a link). The link may directly connect the GPUs (e.g., using NVLINK) or may connect the GPUs through a switch (e.g., using NVSwitch). When combined together, each GPU 1308 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1306 and/or the GPU(s) 1308, the logic unit(s) 1320 may be configured to execute at least some of the computer-readable instructions to control one or more components of the computing device 1300 to perform one or more of the methods and/or processes described herein. In embodiments, the CPU(s) 1306, the GPU(s) 1308, and/or the logic unit(s) 1320 may discretely or jointly perform any combination of the methods, processes and/or portions thereof. One or more of the logic units 1320 may be part of and/or integrated in one or more of the CPU(s) 1306 and/or the GPU(s) 1308 and/or one or more of the logic units 1320 may be discrete components or otherwise external to the CPU(s) 1306 and/or the GPU(s) 1308. In embodiments, one or more of the logic units 1320 may be a coprocessor of one or more of the CPU(s) 1306 and/or one or more of the GPU(s) 1308.

Examples of the logic unit(s) 1320 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1310 may include one or more receivers, transmitters, and/or transceivers that enable the computing device 1300 to communicate with other computing devices via an electronic communication network, included wired and/or wireless communications. The communication interface 1310 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1320 and/or communication interface 1310 may include one or more data processing units (DPUs) to transmit data received over a network and/or through interconnect system 1302 directly to (e.g., a memory of) one or more GPU(s) 1308.

The I/O ports 1312 may enable the computing device 1300 to be logically coupled to other devices including the I/O components 1314, the presentation component(s) 1318, and/or other components, some of which may be built in to (e.g., integrated in) the computing device 1300. Illustrative I/O components 1314 include a microphone, mouse, keyboard, joystick, game pad, game controller, satellite dish, scanner, printer, wireless device, etc. The I/O components 1314 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be include depth cameras, such as stereoscopic camera systems, infrared camera systems, RGB camera systems, touchscreen technology, and combinations of these, for gesture detection and recognition. Additionally, the computing device 1300 may include accelerometers or gyroscopes (e.g., as part of an inertia measurement unit (IMU)) that enable detection of motion. In some examples, the output of the accelerometers or gyroscopes may be used by the computing device 1300 to render immersive augmented reality or virtual reality.

The power supply 1316 may include a hard-wired power supply, a battery power supply, or a combination thereof. The power supply 1316 may provide power to the computing device 1300 to enable the components of the computing device 1300 to operate.

The presentation component(s) 1318 may include a display (e.g., a monitor, a touch screen, a television screen, a heads-up-display (HUD), other display types, or a combination thereof), speakers, and/or other presentation components. The presentation component(s) 1318 may receive data from other components (e.g., the GPU(s) 1308, the CPU(s) 1306, DPUs, etc.), and output the data (e.g., as an image, video, sound, etc.).

Example Data Center

Figure 14:
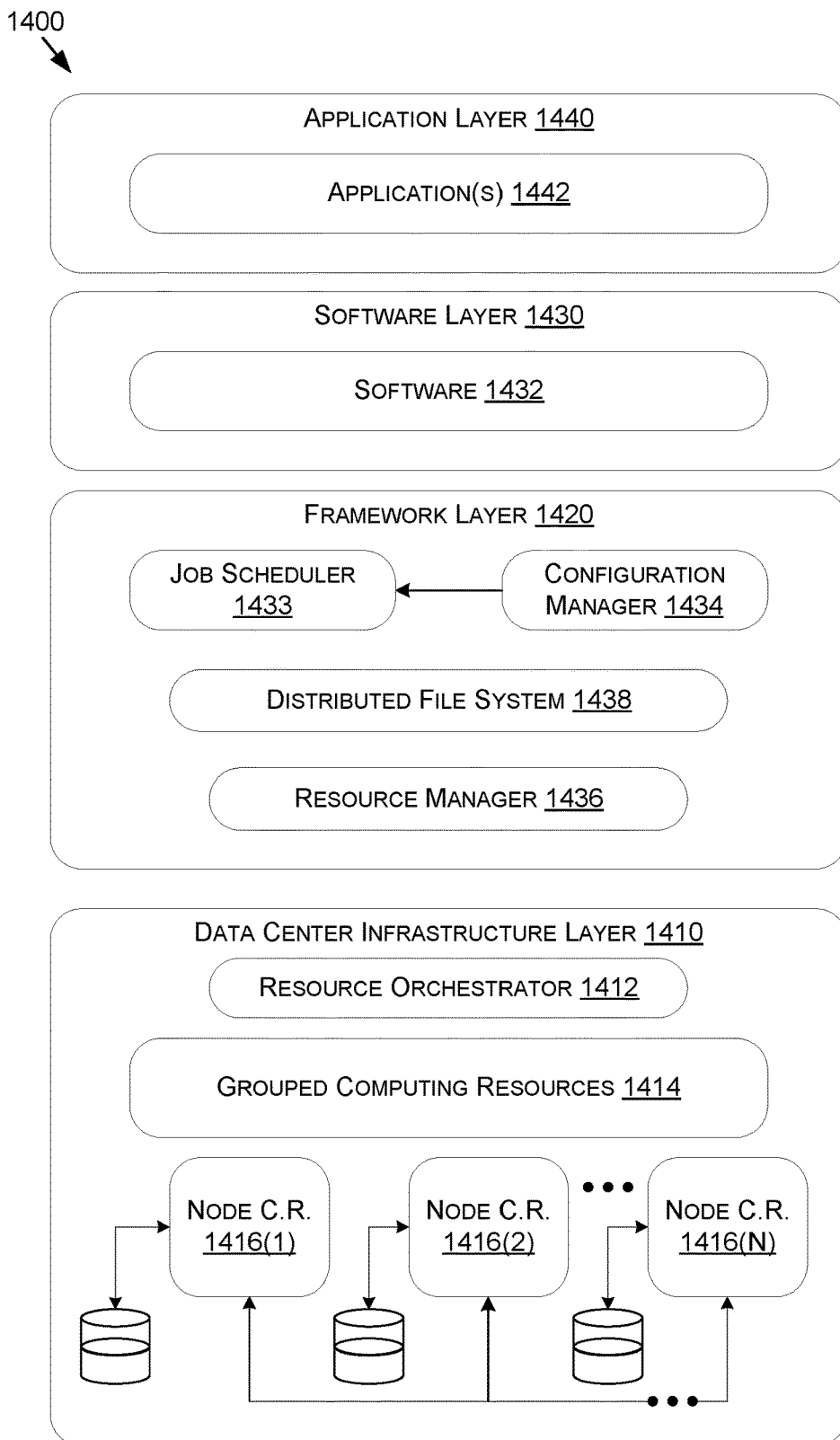
FIG. 14 is a block diagram of an example data center suitable for use in implementing some embodiments of the present disclosure.

FIG. 14 illustrates an example data center 1400 that may be used in at least one embodiments of the present disclosure. The data center 1400 may include a data center infrastructure layer 1410, a framework layer 1420, a software layer 1430, and/or an application layer 1440.

As shown in FIG. 14, the data center infrastructure layer 1410 may include a resource orchestrator 1412, grouped computing resources 1414, and node computing resources ("node C.R.s") 1416(1)-1416(N), where "N" represents any whole, positive integer. In at least one embodiment, node C.R.s 1416(1)-1416(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1416(1)-1416(N) may correspond to a server having one or more of the above-mentioned computing resources. In addition, in some embodiments, the node C.R.s 1416(1)-14161(N) may include one or more virtual components, such as vGPUs, vCPUs, and/or the like, and/or one or more of the node C.R.s 1416(1)-1416(N) may correspond to a virtual machine (VM).

In at least one embodiment, grouped computing resources 1414 may include separate groupings of node C.R.s 1416 housed within one or more racks (not shown), or many racks housed in data centers at various geographical locations (also not shown). Separate groupings of node C.R.s 1416 within grouped computing resources 1414 may include grouped compute, network, memory or storage resources that may be configured or allocated to support one or more workloads. In at least one embodiment, several node C.R.s 1416 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1412 may configure or otherwise control one or more node C.R.s 1416(1)-1416(N) and/or grouped computing resources 1414. In at least one embodiment, resource orchestrator 1412 may include a software design infrastructure (SDI) management entity for the data center 1400. The resource orchestrator 1412 may include hardware, software, or some combination thereof.

In at least one embodiment, as shown in FIG. 14, framework layer 1420 may include a job scheduler 1433, a configuration manager 1434, a resource manager 1436, and/or a distributed file system 1438. The framework layer 1420 may include a framework to support software 1432 of software layer 1430 and/or one or more application(s) 1442 of application layer 1440. The software 1432 or application(s) 1442 may respectively include web-based service software or applications, such as those provided by Amazon Web Services, Google Cloud and Microsoft Azure. The framework layer 1420 may be, but is not limited to, a type of free and open-source software web application framework such as Apache Spark™ (hereinafter "Spark") that may utilize distributed file system 1438 for large-scale data processing (e.g., "big data"). In at least one embodiment, job scheduler 1433 may include a Spark driver to facilitate scheduling of workloads supported by various layers of data center 1400. The configuration manager 1434 may be capable of configuring different layers such as software layer 1430 and framework layer 1420 including Spark and distributed file system 1438 for supporting large-scale data processing. The resource manager 1436 may be capable of managing clustered or grouped computing resources mapped to or allocated for support of distributed file system 1438 and job scheduler 1433. In at least one embodiment, clustered or grouped computing resources may include grouped computing resource 1414 at data center infrastructure layer 1410. The resource manager 1436 may coordinate with resource orchestrator 1412 to manage these mapped or allocated computing resources.

In at least one embodiment, software 1432 included in software layer 1430 may include software used by at least portions of node C.R.s 1416(1)-1416(N), grouped computing resources 1414, and/or distributed file system 1438 of framework layer 1420. One or more types of software may include, but are not limited to, Internet web page search software, e-mail virus scan software, database software, and streaming video content software.

In at least one embodiment, application(s) 1442 included in application layer 1440 may include one or more types of applications used by at least portions of node C.R.s 1416 (1)-1416(N), grouped computing resources 1414, and/or distributed file system 1438 of framework layer 1420. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1434, resource manager 1436, and resource orchestrator 1412 may implement any number and type of self-modifying actions based on any amount and type of data acquired in any technically feasible fashion. Self-modifying actions may relieve a data center operator of data center 1400 from making possibly bad configuration decisions and possibly avoiding underutilized and/or poor performing portions of a data center.

The data center 1400 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1400. In at least one embodiment, trained or deployed machine learning models corresponding to one or more neural networks may be used to infer or predict information using resources described above with respect to the data center 1400 by using weight parameters calculated through one or more training techniques, such as but not limited to those described herein.

In at least one embodiment, the data center 1400 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1300 of FIG. 13—e.g., each device may include similar components, features, and/or functionality of the computing device(s) 1300. In addition, where backend devices (e.g., servers, NAS, etc.) are implemented, the backend devices may be included as part of a data center 1400, an example of which is described in more detail herein with respect to FIG. 14.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1300 described herein with respect to FIG. 13. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Example Paragraphs

A: A method comprising: determining, using one or more machine learning models and based at least on image data representative of an image, a classification corresponding to a portion of the image; determining, based at least on map data associated with an environment, that a point within the environment that corresponds to the portion of the image is associated with a driving surface; determining, based at least on the classification, whether the driving surface is occluded at the portion of the image; and generating first data indicating whether the driving surface is occluded at the portion of the image.

B: The method of paragraph A, wherein the determining whether the driving surface is occluded at the portion of the image comprises: determining that the classification does not include one or more surface classifications; and determining, based at least on the classification not including the one or more object classifications, that the driving surface is not occluded at the portion of the image.

C: The method of paragraph A or paragraph B, wherein the determining whether the driving surface is occluded at the portion of the image comprises: determining that the classification includes one or more object classifications; and determining, based at least on the classification including the one or more object classifications, that the driving surface is occluded by one or more objects corresponding to the one or more object classifications at the portion of the image.

D: The method of any one of paragraphs A-C, wherein the determining that the point within the environment is associated with the driving surface comprises: obtaining the map data associated with the environment, the map data representing at least a label and a three-dimensional location for the point within the environment; projecting the three-dimensional location to a two-dimensional location associated with the portion of the image; and determining, based at least on the label, that the point within the environment is associated with the driving surface.

E: The method of any one of paragraphs A-D, wherein the generating the first data comprises generating the first data representing a label associated with the portion of the image, the label indicating one of: the driving surface is not occluded at the portion of the image; the driving surface is occluded by a dynamic object at the portion of the image; or the driving surface is occluded by a static object at the portion of the image.

F: The method of any one of paragraphs A-E, further comprising: determining, using the one or more machine learning models and based at least on the image data, a second classification corresponding to a second portion of the image; determining, based at least on the map data, that a second point within the environment that corresponds to the second portion of the image is associated with the driving surface; determining, based at least on the second classification, whether the driving surface is occluded at the second portion of the image; and generating second data indicating whether the driving surface is occluded at the second portion of the image.

G: The method of any one of paragraphs A-F, further comprising: determining, based at least on the map data, a first distance associated with the point within the environment; and determining, based at least on point cloud data, a second distance associated with the point within the environment, wherein the determining whether the driving surface is occluded at the portion of the image is further based at least on the first distance and the second distance.

H: The method of paragraph G, further comprising: determining whether the second distance is within a threshold distance to the first distance, wherein the determining whether the driving surface is occluded at the portion of the image is further based at least on whether the first distance is within the threshold distance to the second distance.

I: The method of paragraph G, further comprising: generating a first determination of whether the driving surface is occluded at the portion of the image based at least on the classification; and generating a second determination of whether the driving surface is occluded at the portion of the image based at least on the first distance and the second distance, wherein the determining whether the driving surface is occluded at the portion of the image is based at least on the first determination and the second determination.

J: A system comprising: one or more processing units to: determine, based at least on image data representative of an image, a classification corresponding to a portion of the image; determine, based at least on map data associated with an environment, that a point within the environment that corresponds to the portion of the image is associated with a traffic object; determine, based at least on the classification, whether the traffic object is occluded at the portion of the image; and generate first data indicating whether the traffic object is occluded at the portion of the image.

K: The system of paragraph J, wherein the determination of whether the traffic object is occluded at the portion of the image comprises: determining that the classification corresponds to the traffic object; and determining, based at least on the classification corresponds to the traffic object, that the traffic object is not occluded at the portion of the image.

L: The system of paragraph J or paragraph K, wherein the determination of whether the traffic object is occluded at the portion of the image comprises: determining that the classification does not correspond to the traffic object; and determining, based at least on the classification not corresponding to the traffic object, that the traffic object is occluded at the portion of the image.

M: The system of any one of paragraphs J-L, wherein the determination that the point within the environment is associated with the traffic object comprises: obtain the map data associated with the environment, the map data representing at least a label and a three-dimensional location for the point within the environment; project the three-dimensional location to a two-dimensional location associated with the portion of the image; and determine, based at least on the label, that the point within the environment is associated with the traffic object.

N: The system of any one of paragraphs J-M, wherein first data represents a label associated with the portion of the image, the label indicating one of: the traffic object is not occluded at the portion of the image; the traffic object is occluded by a dynamic object at the portion of the image; or the traffic object is occluded by a static object at the portion of the image.

O: The system of any one of paragraphs J-N, wherein the one or more processing units are further to: determine, based at least on the image data, a second classification corresponding to a second portion of the image; determine, based at least on the map data, that a second point within the environment that corresponds to the second portion of the image is associated with the traffic object; determine, based at least on the second classification, whether the traffic object is occluded at the second portion of the image; and generate second data indicating whether the traffic object is occluded at the second portion of the image.

P: The system of any one of paragraphs J-O, wherein the one or more processing units are further to: determine, based at least on the map data, a first distance associated with the point within the environment; and determine, based at least on point cloud data, a second distance associated with the point within the environment, wherein the determination of whether the traffic object is occluded at the portion of the image is further based at least on the first distance and the second distance.

Q: The method of paragraph P, wherein the one or more processing units are further to: generate a first determination on whether the traffic object is occluded at the portion of the image based at least on the classification; and generate a second determination of whether the traffic object is occluded at the portion of the image based at least on the first distance and the second distance, wherein the determination of whether the traffic object is occluded at the portion of the image is based at least on the first determination and the second determination.

R: The system of any one of paragraphs J-Q, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing one or more operations using a large language model; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

S: A processor comprising: one or more processing units to generate first data indicating whether an object or a feature is occluded at a portion of an image, wherein a determination as to whether the traffic object is occluded at the portion of the image is generated based at least on a comparison between a first classification and a second classification, the first classification associated with the portion of the image as determined using one or more machine learning models and the second classification determined by projecting one or more labels from a map to the portion of the image.

T: The processor of paragraph S, wherein the processor is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing one or more operations using a large language model; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

U: A method comprising: determining, based at least on map data associated with an environment, a first distance associated with a point within the environment that corresponds to a portion of an image; determining, based at least on point cloud data, a second distance associated with the point within the environment; determining, based at least on the first distance and the second distance, whether a driving surface is occluded at the portion of the image; and generating first data indicating whether the driving surface is occluded at the portion of the image.

V: The method of paragraph U, further comprising: determining whether the second distance is within a threshold distance to the first distance, wherein the determining whether the driving surface is occluded at the portion of the image is based at least on whether the first distance is within the threshold distance to the second distance.

W: The method of paragraph V, wherein the determining whether the driving surface is occluded at the portion of the image comprises one of: determining that the driving surface is not occluded at the portion of the image based at least on the second distance being within the threshold distance to the first distance; or determining that the driving surface is occluded at the portion of the image based at least on the second distance being outside of the threshold distance to the first distance.

X: The method of paragraph V, further comprising determining the threshold distance based at least on at least one of an incident angle associated with the point within the environment or a thickness associated with points at the driving surface.

Y: The method of any one of paragraphs U-X, further comprising: obtaining initial point cloud data associated with the environment; obtaining LiDAR data generated using one or more LiDAR sensors; and generating, based at least on the initial point cloud data and the LiDAR data, the point cloud data associated with the environment.

Z: The method of any one of paragraph U-Y, further comprising: obtaining image data generated using a machine, the image data representative of the image; obtaining LiDAR data generated using the machine and at least partly while generating the image data; and generating, based at least on the LiDAR data, the point cloud data associated with the environment.

AA: The method of any one of paragraphs U-Z, further comprising: determining, based at least on the map data, a third distance associated with a second point within the environment that corresponds to a second portion of the image; determining, based at least on the point cloud data, a fourth distance associated with the second point within the environment; determining, based at least on the third distance and the fourth distance, whether the driving surface is occluded at the second portion of the image; and generating second data indicating whether the driving surface is occluded at the second portion of the image.

AB: The method of any one of paragraphs U-AA, further comprising: determining, based at least on image data representative of the image, a classification corresponding to the portion of the image; and determining, based at least on the map data, that the point within the environment is associated with the driving surface, wherein the determining whether the driving surface is occluded at the portion of the image is further based at least on the classification.

AC: The method of paragraph AB, further comprising: determining a first determination on whether the driving surface is occluded at the portion of the image based at least on the first distance and the second distance; and determining a second determination of whether the driving surface is occluded at the portion of the image based at least on the classification, wherein the determining whether the driving surface is occluded at the portion of the image is based at least on the first determination and the second determination.

AD: A system comprising: one or more processing units to: determine, based at least on map data associated with an environment, a first distance associated with a point within the environment that corresponds to a portion of an image; determine, based at least on point cloud data, a second distance associated with the point within the environment; determine, based at least on the first distance and the second distance, whether a traffic object is occluded at the portion of the image; and generate first data indicating whether the traffic object is occluded at the portion of the image.

AE: The system of paragraph AD, wherein the one or more processing units are further to: determine whether the second distance is within a threshold distance to the first distance, wherein the determination of whether the traffic object is occluded at the portion of the image is based at least on whether the first distance is within the threshold distance to the second distance.

AF: The system of paragraph AE, wherein the determination of whether the traffic object is occluded at the portion of the image comprises one of: determining that the traffic object is not occluded at the portion of the image based at least on the second distance being within the threshold distance to the first distance; or determining that the traffic object is occluded at the portion of the image based at least on the second distance being outside of the threshold distance to the first distance.

AG: The system of paragraph AE, wherein the one or more processing units are further to determine the threshold distance based at least on an incident angle associated with the point within the environment or a thickness associated with points at the driving surface.

AH: The system of any one of paragraphs AD-AG, wherein the one or more processing units are further to: obtain initial point cloud data associated with the environment; obtain LiDAR data generated using one or more LiDAR sensors; and generate, based at least on the initial point cloud data and the LiDAR data, the point cloud data associated with the environment.

AI: The system of any one of paragraphs AD-AH, wherein the one or more processing units are further to: obtain image data generated using a machine, the image data representative of the image; obtain LiDAR data generated using the machine and at least partly while generating the image data; and generate, based at least on the LiDAR data, the point cloud data associated with the environment.

AJ: The system of any one of paragraphs AD-AI, wherein the one or more processing units are further to: determine, based at least on image data representative of the image, a classification corresponding to the portion of the image; and determine, based at least on the map data, that the point within the environment is associated with the traffic object, wherein the determination of whether the traffic object is occluded at the portion of the image is further based at least on the classification.

AK: The system of paragraph AJ, wherein the one or more processing units are further to: determine a first determination on whether the traffic object is occluded at the portion of the image based at least on the first distance and the second distance; and determine a second determination of whether the traffic object is occluded at the portion of the based at least on the classification, wherein the determination of whether the traffic object is occluded at the portion of the image is based at least on the first determination and the second determination.

AL: The system of any one of paragraphs AD-AK, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing one or more operations using a large language model; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

AM: A processor comprising: one or more processing units to generate first data indicating whether a traffic object is occluded at a portion of an image, wherein a determination as to whether the traffic object is occluded at the portion of the image is generated based at least on a first distance associated with a point located within the environment as determined using map data and a second distance associated with the point located within the environment as determined using point cloud data.

AN: The processor of paragraph AM, wherein the processor is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing one or more operations using a large language model; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

What is claimed is:

1. A method comprising:
   determining, based at least on map data associated with an environment, a first distance associated with a point within the environment that corresponds to a portion of an image;
   determining, based at least on point cloud data, a second distance associated with the point within the environment;
   determining, based at least on comparing a difference between the first distance and the second distance to a threshold distance, whether a driving surface is occluded at the portion of the image; and
   generating first data indicating whether the driving surface is occluded at the portion of the image.

2. The method of claim 1, further comprising:
   determining, based at least on the comparing, whether the difference is within the threshold distance,
   wherein the determining whether the driving surface is occluded at the portion of the image is based at least on whether the difference is within the threshold distance.

3. The method of claim 2, wherein the determining whether the driving surface is occluded at the portion of the image comprises one of:
   determining that the driving surface is not occluded at the portion of the image based at least on the difference being within the threshold distance; or
   determining that the driving surface is occluded at the portion of the image based at least on the difference being outside of the threshold distance.

4. The method of claim 2, further comprising determining the threshold distance based at least on at least one of an incident angle associated with the point within the environment or a thickness associated with points at the driving surface.

5. The method of claim 1, further comprising:
   obtaining initial point cloud data associated with the environment;
   obtaining LiDAR data generated using one or more LiDAR sensors; and
   generating, based at least on the initial point cloud data and the LiDAR data, the point cloud data associated with the environment.

6. The method of claim 1, further comprising:
   obtaining image data generated using a machine, the image data representative of the image;
   obtaining LiDAR data generated using the machine and at least partly while generating the image data; and
   generating, based at least on the LiDAR data, the point cloud data associated with the environment.

7. The method of claim 1, further comprising:
   determining, based at least on the map data, a third distance associated with a second point within the environment that corresponds to a second portion of the image;
   determining, based at least on the point cloud data, a fourth distance associated with the second point within the environment;
   determining, based at least on the third distance and the fourth distance, whether the driving surface is occluded at the second portion of the image; and
   generating second data indicating whether the driving surface is occluded at the second portion of the image.

8. The method of claim 1, further comprising:
   determining, based at least on image data representative of the image, a classification corresponding to the portion of the image; and
   determining, based at least on the map data, that the point within the environment is associated with the driving surface,
   wherein the determining whether the driving surface is occluded at the portion of the image is further based at least on the classification.

9. The method of claim 8, further comprising:
   determining a first determination on whether the driving surface is occluded at the portion of the image based at least on the comparing the difference to the threshold distance; and
   determining a second determination of whether the driving surface is occluded at the portion of the image based at least on the classification,
   wherein the determining whether the driving surface is occluded at the portion of the image is based at least on the first determination and the second determination.

10. A system comprising:
    one or more processing units to:
      determine, based at least on map data associated with an environment, a first distance associated with a point within the environment that corresponds to a portion of an image;
      determine, based at least on point cloud data, a second distance associated with the point within the environment;
      determine, based at least on comparing a difference between the first distance and the second distance to a threshold distance, whether a traffic object is occluded at the portion of the image; and
      generate first data indicating whether the traffic object is occluded at the portion of the image.

11. The system of claim 10, wherein the one or more processing units are further to:
    determine, based at least on the comparing, whether the difference is within the threshold distance,
    wherein the determination of whether the traffic object is occluded at the portion of the image is based at least on whether the difference is within the threshold distance.

12. The system of claim 11, wherein the determination of whether the traffic object is occluded at the portion of the image comprises one of:
    determining that the traffic object is not occluded at the portion of the image based at least on the difference being within the threshold distance; or
    determining that the traffic object is occluded at the portion of the image based at least on the difference being outside of the threshold distance.

13. The system of claim 11, wherein the one or more processing units are further to determine the threshold distance based at least on an incident angle associated with the point within the environment or a thickness associated with points within the environment.

14. The system of claim 10, wherein the one or more processing units are further to:
    obtain initial point cloud data associated with the environment;
    obtain LiDAR data generated using one or more LiDAR sensors; and
    generate, based at least on the initial point cloud data and the LiDAR data, the point cloud data associated with the environment.

15. The system of claim 10, wherein the one or more processing units are further to:
    obtain image data generated using a machine, the image data representative of the image;

obtain LiDAR data generated using the machine and at least partly while generating the image data; and generate, based at least on the LiDAR data, the point cloud data associated with the environment.

16. The system of claim 10, wherein the one or more processing units are further to:

determine, based at least on image data representative of the image, a classification corresponding to the portion of the image; and determine, based at least on the map data, that the point within the environment is associated with the traffic object, wherein the determination of whether the traffic object is occluded at the portion of the image is further based at least on the classification.

17. The system of claim 16, wherein the one or more processing units are further to:

determine a first determination on whether the traffic object is occluded at the portion of the image based at least on the comparing the difference to the threshold distance; and determine a second determination of whether the traffic object is occluded at the portion of the based at least on the classification, wherein the determination of whether the traffic object is occluded at the portion of the image is based at least on the first determination and the second determination.

18. The system of claim 10, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing one or more operations using a large language model;

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

19. A processor comprising:

one or more processing units to generate first data indicating whether a traffic object is occluded at a portion of an image, wherein a determination as to whether the traffic object is occluded at the portion of the image is generated based at least on comparing a difference between a first distance associated with a point located within an environment as determined using map data and a second distance associated with the point located within the environment as determined using point cloud data to a threshold distance.

20. The processor of claim 19, wherein the processor is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using a large language model;

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

* * * * *